US010861318B2

United States Patent
Wengrovitz et al.

(10) Patent No.: US 10,861,318 B2
(45) Date of Patent: *Dec. 8, 2020

(54) WEARABLE SMART ROUTER

(71) Applicant: MUTUALINK, INC., Wallingford, CT (US)

(72) Inventors: Michael S. Wengrovitz, Concord, MA (US); Derrell Lipman, Billerica, MA (US); Joseph R. Mazzarella, Tolland, CT (US)

(73) Assignee: Mutualink, Inc., Wallingford, CT (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/363,750

(22) Filed: Mar. 25, 2019

(65) Prior Publication Data
US 2019/0221106 A1 Jul. 18, 2019

Related U.S. Application Data

(63) Continuation of application No. 15/331,320, filed on Oct. 21, 2016, now Pat. No. 10,242,556, which is a
(Continued)

(51) Int. Cl.
*G08B 25/14* (2006.01)
*H04W 40/02* (2009.01)
(Continued)

(52) U.S. Cl.
CPC .............. *G08B 25/14* (2013.01); *G08B 25/10* (2013.01); *H04L 12/4641* (2013.01);
(Continued)

(58) Field of Classification Search
CPC ... G08B 25/14; G08B 25/10; H04W 12/0609; H04W 4/80; H04W 76/14; H04W 76/12;
(Continued)

(56) References Cited

U.S. PATENT DOCUMENTS 5,081,071 A   1/1992   Hirschkoff
7,643,445 B2  1/2010   Mills et al.
(Continued)

FOREIGN PATENT DOCUMENTS

EP   2557892 A1   2/2013

OTHER PUBLICATIONS

International Search Report Directed to International Application No. PCT/US2016/016583, dated Jun. 13, 2016; 4 pages.
(Continued)

*Primary Examiner* — Walter J Divito
(74) *Attorney, Agent, or Firm* — Sterne, Kessler, Goldstein & Fox, P.L.L.C.

(57) ABSTRACT

Embodiments include a system, method, and computer program product for a wearable smart device that provides improved connectivity for performing interoperability gateway functions for a variety of devices. In an embodiment, the wearable smart device receives data monitored by one or more devices within a proximity threshold via respective communication channels of the one or more devices. The wearable smart device detects two or more connectivity paths for providing access to a wide area network. Then, the wearable smart device monitors first statuses of the one or more devices and respective communication channels, and second statuses of the two or more connectivity paths. Based on the monitored first and second statuses, the wearable smart device selects one of detected connectivity paths. Then, the wearable smart device communicates the monitored data to an agency via the selected connectivity path.

20 Claims, 13 Drawing Sheets

Related U.S. Application Data continuation-in-part of application No. 14/919,177, filed on Oct. 21, 2015, now Pat. No. 10,269,234.

(60) Provisional application No. 62/307,885, filed on Mar. 14, 2016.

(51) Int. Cl.

| | |
|---|---|
| *H04L 12/26* | (2006.01) |
| *H04L 12/46* | (2006.01) |
| *G08B 25/10* | (2006.01) |
| *H04W 4/80* | (2018.01) |
| *H04W 76/14* | (2018.01) |
| *H04W 76/12* | (2018.01) |
| *H04W 12/06* | (2009.01) |
| *H04W 84/18* | (2009.01) |
| *H04W 84/04* | (2009.01) |
| *H04W 88/16* | (2009.01) |

(52) U.S. Cl.
CPC ......... *H04L 43/0811* (2013.01); *H04W 4/80* (2018.02); *H04W 12/0609* (2019.01); *H04W 40/02* (2013.01); *H04W 76/12* (2018.02); *H04W 76/14* (2018.02); *H04W 84/042* (2013.01); *H04W 84/18* (2013.01); *H04W 88/16* (2013.01)

(58) Field of Classification Search
CPC ... H04W 40/02; H04W 84/18; H04W 84/042; H04W 88/16; H04L 43/0811; H04L 12/4641

See application file for complete search history.

(56) References Cited

U.S. PATENT DOCUMENTS

| | | | |
|---|---|---|---|
| 8,320,874 B2 | 11/2012 | Mills et al. | |
| 8,364,153 B2 | 1/2013 | Boucher et al. | |
| 8,731,583 B2 | 5/2014 | Wengrovitz | |
| 8,811,940 B2 | 8/2014 | Boucher et al. | |
| 9,871,575 B2 | 1/2018 | Wengrovitz et al. | |
| 10,242,556 B2 | 3/2019 | Wengrovitz et al. | |
| 2004/0066273 A1 | 4/2004 | Cortina et al. | |
| 2005/0286476 A1 | 12/2005 | Crosswy et al. | |
| 2007/0103292 A1 | 5/2007 | Burkley et al. | |
| 2007/0190368 A1 | 8/2007 | Jung et al. | |
| 2010/0083730 A1 | 4/2010 | Le et al. | |
| 2010/0085469 A1 | 4/2010 | Takemasa | |
| 2010/0250921 A1 | 9/2010 | Spencer et al. | |
| 2012/0134257 A1 | 5/2012 | Knox | |
| 2013/0006673 A1 | 1/2013 | Hurston et al. | |
| 2013/0198517 A1 | 8/2013 | Mazzarella | |
| 2014/0018001 A1 | 1/2014 | Nakra et al. | |
| 2014/0173700 A1 | 6/2014 | Awan et al. | |
| 2014/0219784 A1 | 8/2014 | Nourollah | |
| 2014/0240124 A1 | 8/2014 | Bychkov | |
| 2015/0004927 A1 | 1/2015 | Mao et al. | |
| 2015/0126119 A1 | 5/2015 | Schulz et al. | |
| 2015/0180978 A1 | 6/2015 | Canpolat et al. | |
| 2015/0182132 A1 | 7/2015 | Harris et al. | |
| 2015/0234986 A1 | 8/2015 | Dantsker et al. | |
| 2016/0100303 A1 | 4/2016 | Kim et al. | |
| 2016/0233946 A1 | 8/2016 | Wengrovitz et al. | |
| 2016/0249158 A1 | 8/2016 | Tredoux et al. | |
| 2017/0116846 A1 | 4/2017 | Wengrovitz et al. | |
| 2019/0221106 A1 | 7/2019 | Wengrovitz et al. | |

OTHER PUBLICATIONS

International Preliminary Report on Patentability and Written Opinion Directed to International Application No. PCT/US2016/016583, dated Aug. 8, 2017; 7 pages.

International Search Report Directed to Related International Application No. PCT/US2016/058222, dated Mar. 30, 2017; 6 pages.

International Preliminary Report on Patentability and Written Opinion Directed to Related International Application No. PCT/US2016/058222, dated Apr. 24, 2018; 12 pages.

WEARABLE SMART ROUTER

CROSS-REFERENCE TO RELATED APPLICATIONS

This application claims the benefit of U.S. Appl. No. 62/307,885, filed Mar. 14, 2016, which is hereby incorporated by reference in its entirety. This application is a continuation application of U.S. application Ser. No. 15/331,320, filed Oct. 21, 2016, which is a continuation-in-part application of U.S. application Ser. No. 14/919,177, filed Oct. 21, 2015, both of which are hereby incorporated by reference in their entireties.

BACKGROUND

Field

The embodiments generally relate to providing a wearable smart router, and more particularly, to providing a portable self-contained mesh-capable device having a flexible architecture for providing intelligently routed gateway functions for a variety of wearable devices.

Background

Presently, a plethora of disparate communications resources exist including resources using private wireless communications (e.g., public safety and first responder communications networks), public switched network communications resources, public wireless networks, networks of video surveillance devices, private security networks, and the like. Additionally, millions of consumers and public officials are now equipped with smartphone devices that include multiple communications abilities including both voice and video communications.

Often these communications resources cannot communicate with each other. For example, private wireless communication networks, such as those used by public safety or commercial users, are typically isolated from one another and utilize different and often incompatible technologies operating in different cellular frequency bands. While interoperability products are available to interconnect such diverse systems, cooperation among the entities involved is often a barrier to full and scalable implementation. Thus, first responder communication systems exist (e.g., silo-ed communications systems), where control of the resources of each organization coupled to the system is controlled by a central administrator or controller, and each organization providing resources to the system must relinquish control of its resources to the central administrator. The organization responsible for the operation of its radio system(s) may be unable or unwilling to grant control of its resources either to peer organizations or to a higher-level organization.

U.S. Pat. No. 7,643,445, entitled Interoperable Communications System and Method of Use, issued on Jan. 5, 2010, and U.S. Pat. No. 8,320,874, entitled System and Method for Establishing an Incident Communications Network, issued on Nov. 27, 2012, both of which are incorporated by reference in their entirety, describe systems and methods for providing an interoperable communications system ("interop system," also referred to as an Incident Communications Network) including a plurality of otherwise disjunct or disparate communications systems that addressed the deficiencies of prior art systems. The '445 and '874 patents specifically describe methods for establishing an incident communications network that enables interoperable communications among communications resources controlled by multiple organizations during an incident involving emergency or pre-planned multi-organization communications wherein a communications resource is controlled by an administrator within an organization.

Additionally, U.S. Pat. No. 8,364,153, entitled Mobile Interoperability Workstation Controller Having Video Capabilities within an Incident Communications Network, issued on Jan. 29, 2013, ("Mobile IWC Patent"), which is also incorporated herein by reference in its entirety, extends the concepts of the '445 and '874 patents. Namely, the Mobile IWC Patent includes enhanced video capture and streaming capabilities that are integrated with incident information and events to facilitate improved management and analysis of incidents or events in which an incident communications network is employed.

U.S. Pat. No. 8,811,940, entitled Dynamic Asset Marshalling Within an Incident Communications Network, issued on Aug. 19, 2014, ("Marshalling Patent") which is also incorporated herein by reference in its entirety, extends the concepts of the '445 and '874 patents. Namely, the Marshalling Patent provides systems and methods that marshal resources into an incident communications network based on a variety of factors, such as the type of incident and the type of resource being marshaled.

U.S. Patent Publication 2013/0198517, entitled Enabling Ad Hoc Trusted Connections Among Enclaved Communication Communities, filed on Mar. 13, 2013, ("Enclaved Application") which is also incorporated herein by reference in its entirety, extends the concepts of the '445 and '874 patents. Namely, the Enclave Application presents systems and methods for dynamic access among secure communities, such as incident communications networks, that enables communication resources of a first secure community to securely access and/or utilize communication resources within other secure communities.

Wearable Devices Operating Specific Communication Interfaces

In conventional mobile gateway systems, an agency may provide a system of gateways mounted within racks on vehicles. Instead of having gateways that are agency based, what is needed are gateways that are based on individual field personnel.

But, individual field personnel often carry a plurality of wearable devices including, potentially, legacy devices using outdated communication interfaces or protocols and including recently-released devices using the most current and advanced communication interfaces and protocols. Current gateways are not field personnel based and may not be able to support the vast array of communication interfaces operated by the wearable devices.

Inflexible Gateways

Moreover, not only are conventional gateways statically mounted to, for example, vehicles, conventional gateways are also not flexibly configured to access or connect to a wide area data network, e.g., a wireless broadband network. Therefore, connectivity provided by conventional gateways may be less reliable and more prone to interference or poor reception.

BRIEF SUMMARY OF THE INVENTION

What is needed is a system, method, and computer medium storage for a wearable smart wearable smart device that provides improved connectivity for performing interoperability gateway functions for a variety of devices. To improve connectivity of conventional inflexible gateways, embodiments describe wearable smart devices, e.g., gateways having intelligent routing, that are portable, self-contained, and capable of utilizing one or more detected connectivity paths to efficiently access the wide area data network.

In an embodiment, the wearable smart device receives data monitored by one or more devices within a proximity threshold via respective communication channels of the one or more devices. The wearable smart device detects two or more connectivity paths for providing access to a wide area network. Then, the wearable smart device monitors first statuses of the one or more devices and respective communication channels, and second statuses of the two or more connectivity paths. Based on the monitored first and second statuses, the wearable smart device selects one of detected connectivity paths. Then, the wearable smart device communicates the monitored data to an agency via the selected connectivity path.

Further embodiments, features, and advantages, as well as the structure and operation of the various embodiments, are described in detail below with reference to accompanying drawings. It is noted that the embodiments are presented herein for illustrative purpose only. Additional embodiments will be apparent to persons skilled in the relevant art(s) based on the teachings contained herein.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention.

The drawing in which an element first appears is typically indicated by the leftmost digit or digits in the corresponding reference number. In the drawings, like reference numbers may indicate identical or functionally similar elements.

DETAILED DESCRIPTION

System

Figure 1:
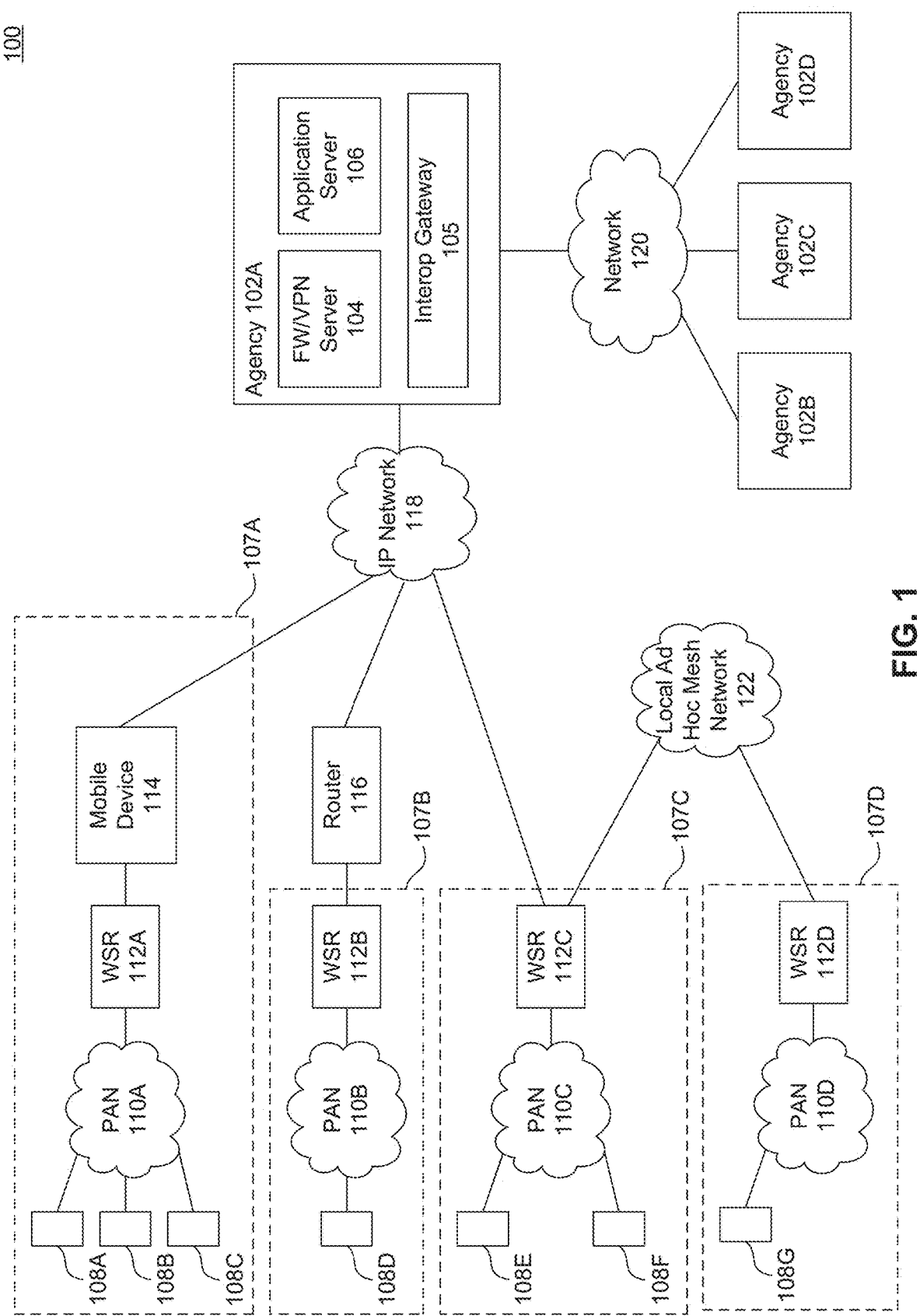
FIG. 1 is a block diagram of a system for configuring and managing wearable smart routers (WSRs), according to an embodiment.

FIG. 1 illustrates an example system 100 for configuring and managing wearable smart routers (WSRs), according to an example embodiment. As shown, system 100 may include agencies 102 and field personnel 107 that are associated with, for example, agency 102A.

Field personnel 107 may be armed forces personnel, public safety workers, or first responders, which may include police officers, firefighters, paramedics, and emergency medical technicians. To respond to emergencies and communicate effectively amongst each other, field personnel 107 such as first responder may carry or wear a host of wearable devices 108 including, for example, body cameras and body-worn biosensors.

In an embodiment, wearable devices 108 may be individual devices that are carried or held by, nearby, or associated with field personnel 107, and which operate on different communication interfaces or protocols. Possible protocols may include wireless or wired communication protocols such as WiFi, Bluetooth, USB wire, Zigbee, or a proprietary communication protocol. For example, field personnel 107C may be operating devices 108E-F. Whereas device 108E may use WiFi and is strapped to the chest, device 108F may use ZigBee and is worn on top of the head. In an embodiment, wearable devices 108 may also include mobile device 114. In an embodiment, wearable devices 108, such as wearable device 108A, may be a remote controller for accessing or controlling a separate device, such as a drone or robot. Wearable device 108A may wirelessly communicate with a drone (not shown) and include a display for viewing visual or audio information captured by another device, e.g., the drone. By establishing connectivity to wearable device 108A, WSR 112A may then transmit and share with an operator of agency 102A through IP network 118 the visual or audio information captured by the remote device controlled by wearable device 108A.

In an embodiment, one or more of wearable device 108 may not be capable of accessing IP network 118 in real time due to limitations on hardware, size, or software versions. Or wearable device 108 may be a device implemented with limited network capabilities or with proprietary communication interfaces. Field personnel 107 may, therefore, carry or wear WSR 112 that relays information gathered by wearable devices 108 to agency 102A through IP network 118. WSR 112 may further associate the gathered information with a specific time and with each other. IP network 118 may be representative of a wired and/or wireless network, and may include any combination of local area networks (LANs), wide area networks (WANs), the Internet, a radio-mobile network like 3G or 4G Long-Term Evolution (LTE), or another wide area data communications network, etc.

WSR 112 may be implemented on one or more processors that provide personal area network (PAN) 110 for detecting and communicating with both legacy and emerging wearable devices 108 being operated by respective field personnel 107. Particularly, WSR 112 may establish communication channels, which may include wired or wireless data communication links, with wearable devices 108 that each may possibly be operating different communication interfaces. The established communication channels enable WSR 112 to telemeter real-time data monitored by potentially disparate (e.g., using different communication technologies or interfaces) wearable devices 108 to agency 102A.

Figure 7:
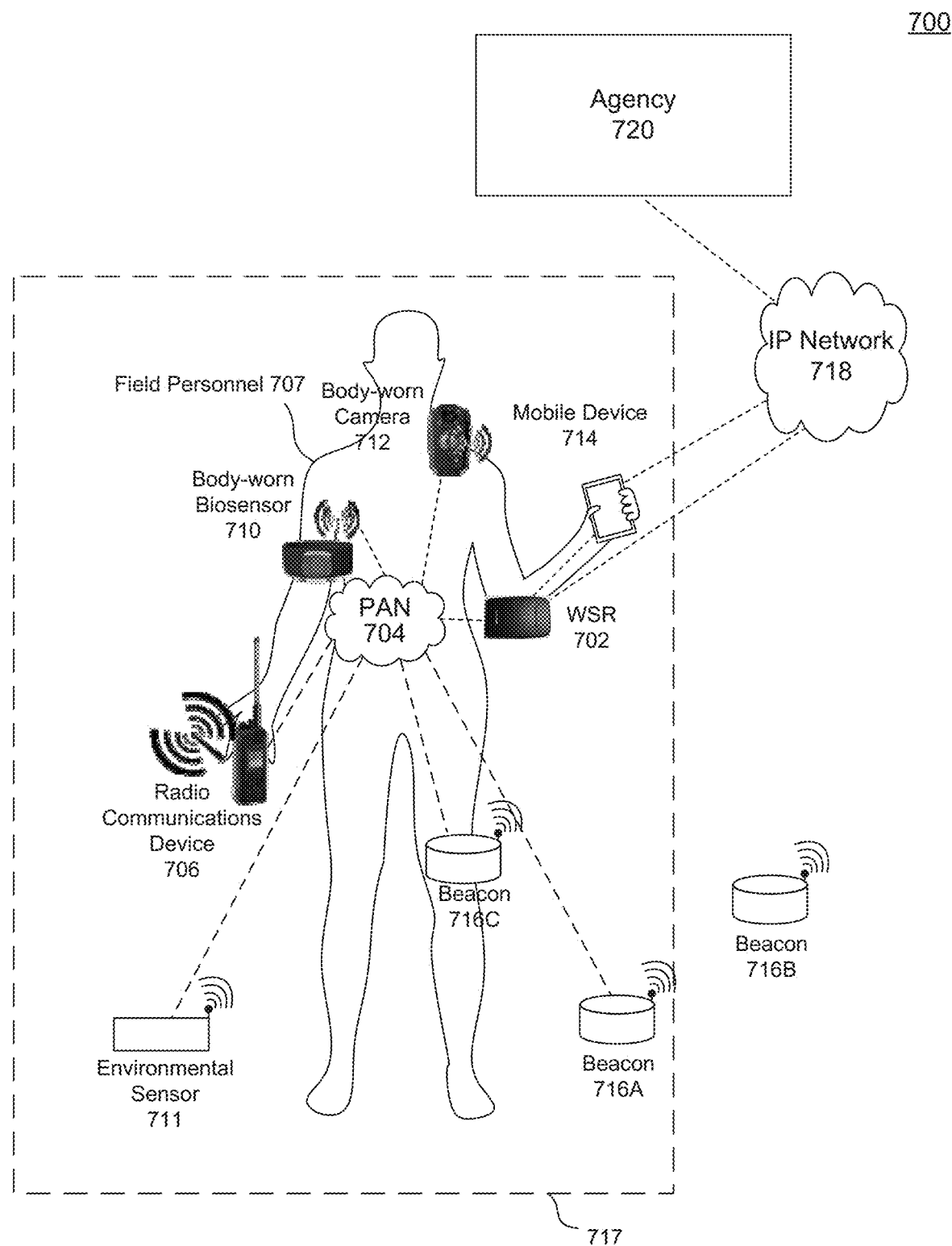
FIG. 7 is a block diagram of a system of a field personnel operating a WSR and a plurality of wearable devices, according to an embodiment.

FIG. 7 illustrates a more detailed system 700 including field personnel 707 operating a plurality of wearable devices and using WSR 702 to telemeter data gathered by the plurality of devices within proximity 717 to agency 720 through IP network 718, according to an example embodiment. In an embodiment, field personnel 707, WSR 702, IP network 718, and Agency 720, may be exemplary field personnel 107A, WSR 112A, IP network 118, and agency 102A from FIG. 1, respectively.

Beacon 716 may be a device that transmits pings or wireless signals indicating a presence of beacon 716. Beacon 716 may be a wearable device, such as beacon 716C, or non-wearable devices, such as beacons 716A-B. In an embodiment, beacon 716 may be configured by agency 720 to transmit pings or wireless signals periodically, continuous, or on-demand. In an embodiment, upon field personnel 707 entering a communication range of beacon 716, specifically beacon 716A that is within proximity 717, WSR 702 may telemeter received pings from beacon 716A to agency 720.

In an embodiment, field personnel 707 may wear or hold WSR 702 that provides PAN 704, such as PAN 110A, for communicating with a plurality of wearable devices, such as wearable devices 108A-C from FIG. 1, including at least one of body-worn biosensor 710, body-worn camera 712, radio communications device 706, beacon 716C, or mobile device 714. WSR 702 may also provide and enable communication links with devices that are not necessarily wearable including environmental sensor 711 and beacons 716A-B. As shown in FIG. 7, WSR 702 may establish communication with beacon 716A, which is non-wearable, because beacon 716A is within proximity 717. But, WSR 702 may be unable to communicate with or refuse communication with beacon 716B, which is also non-wearable, because beacon 716B is not within proximity 717.

PAN 704 includes one or more wired and/or a wireless data communication links for wearable devices in close proximity. For example, PAN 704 may include at least one of a wired interface including but not limited to a universal serial bus (USB), or a wireless interface including but not limited to: a Bluetooth, WiFi, Zigbee, or other wireless protocols. The number and types of wired or wireless communication interfaces or protocols supported by WSR 702 within PAN 704 may depend on the number and types of plug-ins stored and installed on WSR 702.

Body-worn biosensor 710 are sensor devices that may monitor one or more biometric signal including, for example, a fingerprint information, a respiration rate, a heart rate, a blood pressure, a perspiration rate, an oxygen level, a body temperature, a voltaic skin response, a bioelectric activity (e.g., EKG, EEG, neuronal probe data), an altitude, a pitch, a yaw, a rotation or other angular movement, a position, a force, a location, an acceleration, a deceleration, or a change in any of the above (e.g., a change in respiration rate, a change in an acceleration, or a change in a voltaic skin response). For example, body-worn biosensor 710 may be a wrist-strapped watch that measures multiple biometric signals.

Environmental sensor 711 may be a body-worn or proximate device that monitor one or more environmental statuses such as an ambient temperature, a wind chill, a dew point, a radiation level, a smoke level, a chemical level, a biological agent, a sound, a pressure, a humidity level, a precipitation level, an air pollutant, a lightning strike, a terrain, an altitude, a location (e.g., from a global positioning system (GPS)), or an air quality level. In an embodiment, WSR 702 may provide PAN 704 to environmental sensor 711 when within a wireless communication range or within a proximity threshold distance of environmental sensor 711 and WSR 702 includes a plug-in or driver supporting the communication interface for telemetering statuses gathered by environmental sensor 711. In an embodiment, the proximity threshold distance may be determined based on comparing geolocations between the WSR 702 and the wearable devices, such as environmental sensor 711.

In an embodiment, non-wearable beacon 716 including, for example, beacons 716A-B may be devices mounted in a room and have a communication range or proximity threshold configured based on the size of the room. In an embodiment, a mounted beacon, i.e., beacon 716A, may detect the number of field personnel 707 or specific field personnel 707 within the room. For example, whenever any field personnel, such as field personnel 707, enters within the communication range or proximity threshold associated with beacon 716A (e.g., by entering the room), beacon 716A may detect a presence of field personnel 707. Beacon 716A may then alert associated agencies, such as agency 720, of detected information by direct connection to IP network 718 or via WSR 702 of one field personnel 707 within the communication range of beacon 716A.

In an embodiment where agency 70720 knows an absolute location of beacon 716, a relative position of field personnel 707 may be determined based on the telemetered ping indicating field personnel 707 is proximate to beacon 716. In an embodiment, agency 720 may receive an absolute location, such as a GPS location, of beacon 716 from beacon 716 or from the received ping.

In an embodiment, although WSR 702 may detect both beacon 716A and beacon 716B, WSR 702 may only telemeter information and statuses from beacon 716A to agency 720 and not beacon 716B due to settings or parameters stored in WSR 702. In an embodiment, the parameters may be received from agency 720 and include one or more of a beacon signal strength threshold, a distance threshold from a beacon, a processing bandwidth of WSR 702, or communication bandwidth to IP network 718.

Body-worn camera 712 may wearable devices that may record or store images, audio, or video data. In an embodiment, body-worn camera 712 may be activated and deactivated based on signals electronically received from WSR 702. A received signal may initiate audio and visual recording as well as the capture of still images that may be streamed, or stored and forwarded to WSR 702 having interoperability gateway functions.

Radio communications device 706 may be a radio device, such as a Wireless Facility (Wi-Fi) radio device, capable of connecting to PAN 704. In an embodiment, with the gateway capabilities of WSR 702, radio communications device 706 may receive from and transmit to radio channels within agency 720 through IP network 718.

Mobile device 714 may be a computing device having broadband data capabilities and implemented with an operating system that may include but is not limited to, for example, the iOS platform produced by Apple Inc. of Cupertino, Calif., the Android platform produced by Google Inc. of Mountain View, Calif., the Windows platform produced by Microsoft Corp. of Redmond, Wash., the Blackberry platform produced by Blackberry Ltd. of Ontario, Calif., or the open-source Linux platform (e.g., a smart phone). In an embodiment, mobile device 714 may include interoperability gateway functions that enable bridging and sharing of data from WSR 702 to IP network 718. Mobile device 714 with broadband data may be coupled to IP network 718 using, for example, 3G or 4G LTE network protocols.

In an embodiment, depending on settings, parameters, hardware, or software capability determinations on WSR 702, WSR 702 may telemeter some or all of the data monitored by the wearable devices to IP network 718 through mobile device 714. For example, WSR 702 may detect that battery power is low and forward data to mobile device 714 to save power.

Returning to FIG. 1, WSR 112 may be dynamically and remotely programmed by agency 102A to support the variety of communication interfaces compatible with respective wearable devices 108. For example, WSR 112A may wirelessly receive and install a driver or plug-in to support a particular application operating on wearable device 108C compatible with, for example, only a USB interface. With the installed plug-in in WSR 112A, field personnel 107A may directly connect wearable device 108C to WSR 112A via a USB cable and telemeter information collected by wearable device 108C in real-time to agency 102A.

In an embodiment, WSR 112 may include intelligent routing algorithms for selecting, from possible connectivity paths, an optimal connectivity path for accessing a wide area data network, such as IP network 118. In an embodiment, WSR 112 may be a wearable smart gateway, as described in U.S. patent application Ser. No. 14/919,177, filed on Oct. 21, 2015, titled *Wearable Smart Gateway*, having dynamic and intelligent routing functionality. Connectivity paths may include one or more direct connections to IP network 118 via one or more networking chips inside WSR 112, or one or more proxy or indirect connections to IP network 118 via proximate devices. In an embodiment as described with respect to FIGS. 2, 3, 8, 9, and 11, the intelligent routing algorithms, implemented using hardware, software or a combination of both, within WSR 112, may route data from connected wearable devices 108 to agency 102A via two more selected connectivity paths.

As shown in FIG. 1, WSR 112, such as WSR 112C, may itself implement a networking chipset that includes one or more networking chips for directly connecting to IP network 118, which may include one or more of Wi-Fi, 3G, 4G LTE, WiMAX, or other wide area data networks. Additionally, WSR 112 may access IP network 118 to connect with agency 102A via one or more indirect connections provided by proximate devices, such as mobile device 114 or router 116. Depending on hardware and software implementation of WSR 112, WSR 112 may connect to mobile device 114 or router 116 through a wired (e.g. Ethernet) or wireless (e.g., Wi-Fi or Bluetooth) communication interface.

In an embodiment, WSR 112 may select from detected connectivity paths and determine an optimal connectivity path to connect with agency 102A. For example, WSR 112A may be within range of router 116 and also be coupled to mobile device 114, which has access to IP network 118. Based on statuses of detected connectivity paths, WSR 112A may select the connectivity path provided by coupled mobile device 114 to telemeter data from wearable devices 108A-108C to agency 102A.

In contrast, WSR 112, such as WSR 112B, may be proximate to just router 116, which may be mounted within a field personnel vehicle and contain networking circuitry for accessing IP network 118. Though WSR 112B may also include networking hardware to directly access IP network 118, WSR 112B may select the connectivity path to IP network 118 provided by router 116 based on statuses of the connectivity paths or internal system statuses. For example, assuming that the connectivity path of router 116 consumes less power and WSR 112B detects that internal battery levels are low, WSR 112B may select the connectivity path of router 116 to conserve power consumption. In another example, WSR 112B may select the connectivity path of router 116 over a direct connection to IP network 118 because, at an instance in time, router 116 may provide a more reliable or greater bandwidth connectivity compared to a direct connection.

In an embodiment, WSR 112C, an example WSR, may include a networking chip capable of accessing a FirstNet network within IP network 118. The FirstNet network may be a 4G LTE-based public safety broadband network dedicated to first responders and operate within a specific frequency band, e.g., band 14, allotted by the government. In an embodiment, the FirstNet network may provide first responders or authorized users prioritized access to a wide area data network, such as IP network 118. Particularly, WSR 112C may include a user authenticator to check whether to grant a user operating WSR 112C prioritized access to the FirstNet network. Therefore, WSR 112C may enable a first responder using a commercial phone, which may be represented by wearable device 108E, to access the FirstNet network regardless of whether wearable device 108E includes a FirstNet networking chip.

In an embodiment, WSR 112 may access IP network 118 via an indirect connectivity path provided by other WSR 112. Particularly, WSR 112 may be a portable mesh capable radio transceiver device that includes and runs a mesh network software application to detect, form, and/or join local ad hoc mesh network 122 with other mesh-capable WSR 112. In an embodiment, electronically transmitting information to another mesh-capable WSR 112 may be a possible, indirect connectivity path to IP network 118. For example, WSR 112C and WSR 112D may be mesh-capable devices where WSR 112C is determined to be an optimal endpoint within local ad hoc mesh network 122 such that WSR 112C may relay and telemeter data and information received from local ad hoc mesh network 122 to agency 102A. In this way, WSR 112D may telemeter data from wearable device 108G without directly accessing IP network 118. For example, WSR 112 may be the man-portable mobile ad-hoc radio based linked extensible (MARBLE) network device described in patent application Ser. No. 14/615,070, which is incorporated herein by reference in its entirety.

In an embodiment and further described with respect to FIGS. 2, 3, 8, 9, and 11, WSR 112 may select one or more connectivity paths for telemetering data monitored by wearable devices 108 connected to respective PAN 110. WSR 112 may select a connectivity path based on a variety of attributes or statuses of connectivity paths or communication channels. For example, attributes may include, but are not limited to, one or more of the following: network congestion, network bandwidth, signal strength, quality of service measured by bit error rate, or proximity of device providing path or channel. In an embodiment, WSR 112 may factor attributes or statuses monitored by WSR 112 and including, but are not limited to, environmental interferences, an actual or relative battery power level of WSR 112, power consumption of WSR 112 to use connectivity paths, processor or memory load of WSR 112, GPS information, time of day, commands received from agency 102A, or parameters or settings stored within WSR 112. The parameters may be preprogrammed within WSR 112 or dynamically received and updated from agency 102A.

To better support first responders' ability to react to dangerous conditions, WSR 112 may be constructed as a compact, lightweight, portable, and palm-sized standalone device enclosed by a hardened casing. In an embodiment, WSR 112 may further include hardware and software for maximizing battery life when not being charged by a power source to provide a first responder with maximum utility.

Agency 102A may be a computer-based system including one or more servers for managing and configuring WSR 112 operated by field personnel 107 associated with agency 102A. In an embodiment, agency 102A may be implemented partly or entirely in a cloud environment, such as a private cloud, a government security cloud, US army cloud, or an Amazon cloud.

In an embodiment, agency 102A may include interop (interoperability) gateway 105, FW/VPN server 104, and application server 106. Though depicted as separate devices, interop gateway 105 and FW/VPN server 104 may be implemented within a single router, server, or gateway device.

Application server 106 may be one or more servers that hosts a WSR application or provide the functionality of the WSR application for managing WSRs 112 and monitoring statuses of field personnel 107 as captured by wearable devices 108 corresponding to respective WSRs 112. In an embodiment, the WSR application may be a server-based software application communicatively coupled to software clients installed and operating on computing devices, such as mobile device 114. In an embodiment, the installed software clients may instead be an application instance of the WSR application. In an embodiment, application server 106 may implement within the WSR application functionalities of an interoperability workstation (not shown) as described in the '445 and '874 patents.

FW/VPN server 104 may include one or more processors for establishing virtual private network (VPN) tunnels or secure communication means between WSR 112 of field personnel 107 and agency 102A. A VPN tunnel enables data communicated between agency 102A and a WSR, such as WSR 112A, to remain encrypted to increase privacy and security. In an embodiment, FW/VPN server 104 may provide end-to-end encryption using one or more of hardware FPG-based or software-based encryption algorithms, such as AES256, as would become apparent to a person having ordinary skill in the art. In an embodiment, FW/VPN server 104 may provide secure communication means by encrypting data sent from FW/VPN server 104.

FW/VPN server 104 may further include firewall functions for monitoring and controlling incoming and outgoing network traffic to and from agency 102A. In an embodiment, firewall functions may be implemented in a separate firewall server coupled to FW/VPN server 104 or be implemented within interop gateway 105.

Interop gateway 105 may include operability gateway functions to transmit statuses or multimedia communications from field personnel 107, which are associated with agency 102A, to other agencies 102B-D through network 120. Similarly, interop gateway 105 may include operability gateway functions to enable agency 102A to receive from agencies 102B-102D similar information of field personnel that are associated with respective agencies 102B-102D. In an embodiment, interop gateway 105 may validate or authorize whether information or statuses of field personnel 107 may be shared.

In an embodiment, agencies 102 may operate separate secure systems or different communication or network interfaces. Additionally, there may exist two or more networks of communications or agencies, each having different secrecy classifications. In an embodiment, interop gateway 105 may be coupled to or include a cross-domain information sharing system. Network 120 may be a network, such as FirstNet network implemented using 4G LTE technology operating in frequency band 14, separate from IP network 118 or a private or public network within IP network 118. Similar to IP network 118, network 120 may be a wired and/or wireless network, and may be any combination of LANs, WANS, etc.

Figure 2:
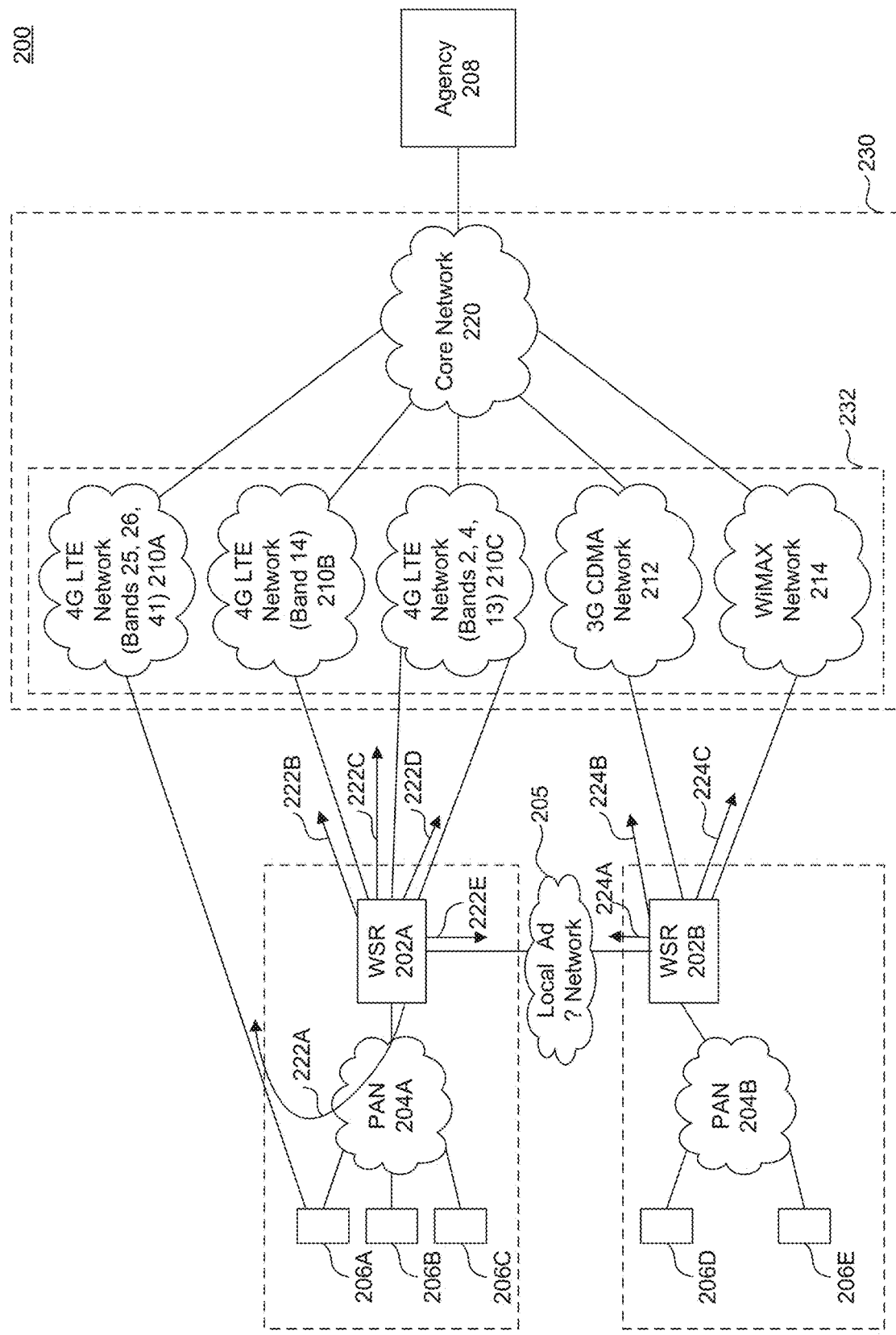
FIG. 2 is a block diagram of a system of WSRs with multiple connectivity paths, according to an embodiment.

FIG. 2 is a block diagram illustrating a system 200 of WSRs 202A and 202B with respective connectivity paths 222 and 224, according to an embodiment. In an embodiment, WSR 202 may be an example of WSR 112 from FIG. 1. Similar to system 100 of FIG. 1, system 200 also includes WSR 202 that provides PAN 204, such as PAN 110, to wearable devices 206, such as wearable devices 108, within proximity of WSR 202. As shown, WSR 202A and 202B may access IP network 230, such as IP network 118, using one or more connectivity paths 222 or 224, respectively. Upon selecting one or more connectivity paths 222, WSR 202A may telemeter data from wearable devices 206A-206C via IP network 230 to agency 208, which may be an example of agency 102A of FIG. 1.

In an embodiment, IP network 230 may include core network 220 and mobile networks 232, which may each be wireless, wide area data networks. In an embodiment, mobile networks 232 may include, but are not limited to, one or more of each of the following: 4G Long-Term Evolution (LTE) networks 210, 3G Code Division Multiple Access (CDMA) network 212, Worldwide Interoperability for Microwave Access (WiMAX) network 214, Wi-Fi network, 3G Global System for Mobile (GSM) network, Enhanced Data (rates) for GSM Evolution (EDGE) network, High Speed Packet Access (HSPA) network, Universal Mobile Telecommunications System (UMTS) network, or other wide area data networks. Core network 220 may include wired or wireless protocols and technologies for providing the backbone infrastructure of IP network 230 including, for example, the Internet. Wired technologies may include, for example, optical fiber or coaxial cable. In an embodiment, 4G LTE networks 210 may include, but are not limited to, one or more separate networks such as, for example, 4G-LTE network (bands 25, 26, 41) 210A, 4G LTE network (band 14) 210B, and 4G LTE network (bands 2, 4, and 13), each of which may be accessible only through respective dedicated networking chips.

In an embodiment, WSR 202, such as WSR 202A, may be capable of accessing two or more mobile networks 232 through detected two or more of connectivity paths 222A-222E. In an embodiment, WSR 202A may include two or more networking chips (e.g., three networking chips) for accessing connectivity paths 222B-D to 4G LTE network 210B, 4G LTE network 210C, and 3G CDMA network 212, respectively. In an embodiment, WSR 202A may access IP network 230 via connectivity paths 222A and 222E provided by wearable device 206A and WSR 202B, respectively.

As depicted in system 200, wearable device 206A may be a mobile phone having a networking chip for accessing 4G LTE network 210A. Therefore, though WSR 202A may not directly access 4G LTE network 210A, WSR 202A may connect to wearable device 206A via PAN 204A, which may include Wi-Fi, to access 4G LTE network 210A. Similarly, WSR 202A may not be capable of accessing WiMAX network 214 due to lack of a networking chip or other factors. For example, WSR 202A may not be in range of WiMAX network 214 or cannot access WiMAX network 214 due to hardware or software error of networking chip, network interference, or poor signal strength. WSR 202B, however, may include a networking chip for accessing WiMAX network 214 and is within range or proximity of WiMAX network 214. Therefore, WSR 202A may access WiMAX network 214 via connectivity path 222E to WSR 202B. WSR 202A may connect to WSR 202B through local ad-hoc mesh network 205, which is further described with respect to local adhoc mesh network 122 of FIG. 1.

In an embodiment, WSR 202A may detect five possible connectivity paths 222A-E for communicating data monitored by wearable devices 206A-C to agency 208. Based on commands from agency 208 or statuses of WSR 202A, statuses of each of connectivity paths 222A-E, or statuses of each communication channel within PAN 204A, WSR 202A may dynamically select one of connectivity paths 222A-E for routing monitored data. By dynamically switching between two or more available connectivity paths 222A-E, WSR 202A may increase the quality and reliability of connection to IP network 230. Additionally, if WSR 202A selects one of connectivity paths 222A-E based on, in part, greater available bandwidth, WSR 202A may also increase the amount of data telemetered from wearable devices 206A to agency 208.

In an embodiment, WSR 202A may select two or more of possible connectivity paths 222A-E for concurrently sending monitored data. By utilizing more than one connectivity path concurrently, WSR 202A may improve the quality and increase bandwidth of monitored data transmitted to agency 208 via IP network 230. For example, WSR 202A may split a single stream of received data into sub-streams or parts to be concurrently sent via two or more of connectivity paths 222A-E. In another example, WSR 202A may send different types of data concurrently via the two or more of connectivity paths 222A-E. For example, voice data may be sent via a network, such as 4G LTE network 210B, dedicated to first responders. Other types of data, such as video data, may have second priority and sent over a separate public network, such as 4G LTE network 210C, if, for example, 4G LTE network 210B becomes overloaded. In an embodiment, each connectivity path may be provided by a corresponding networking chip within WSR 202A. In another embodiment, two or more connectivity paths may be provided by an integrated networking chip or virtual modules within one networking chip.

Figure 3:
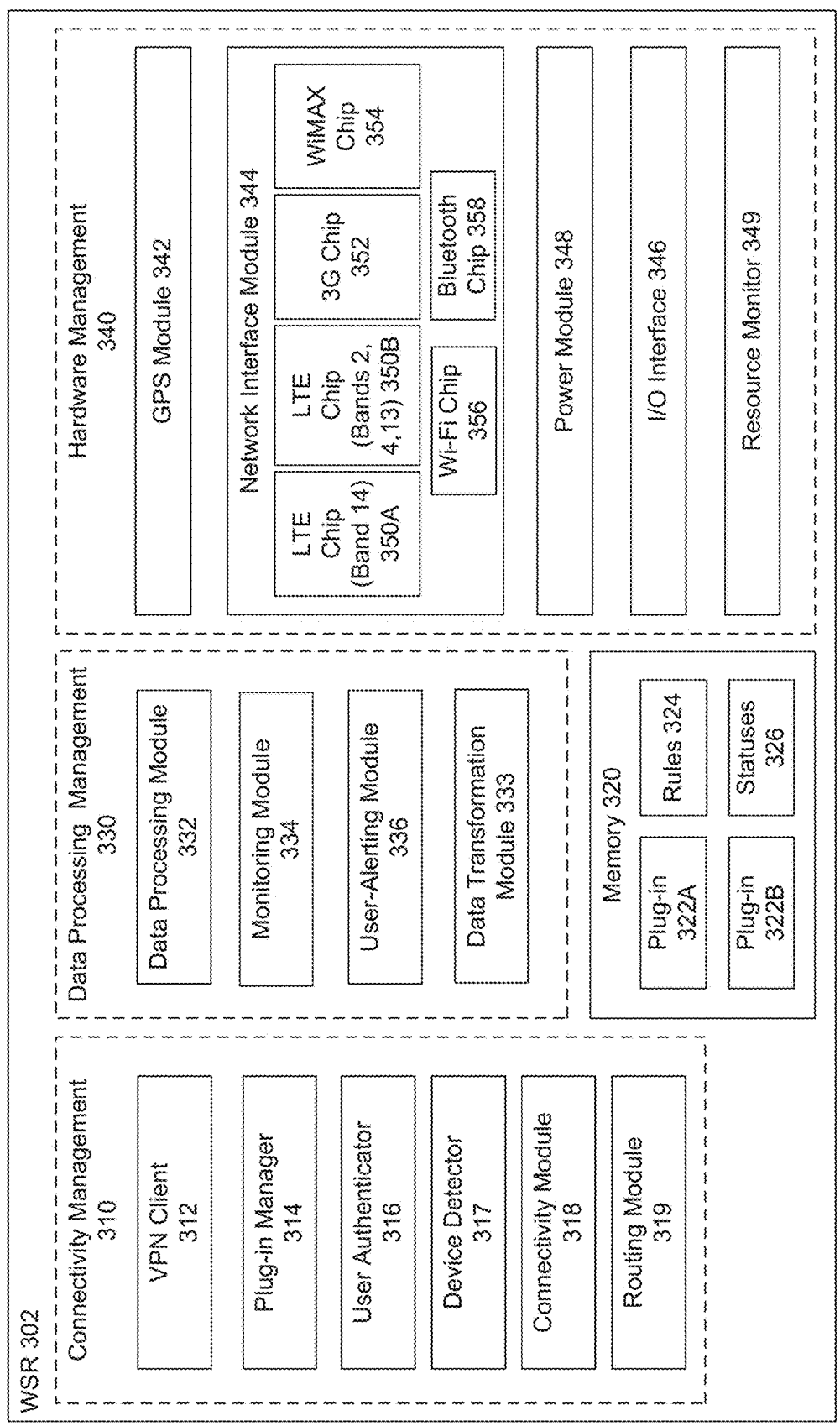
FIG. 3 is a block diagram of a WSR, according to an embodiment.

FIG. 3 is a block diagram of WSR 302 worn by a field personnel and having a flexible software and hardware architecture for enabling wearable devices to securely telemeter monitored or captured data to an agency of the field personnel, according to an example embodiment. WSR 302 may additionally dynamically and intelligently select one or more available connectivity paths to efficiently route monitored data to the agency, such as agency 102A. In an embodiment, WSR 302 may be an exemplary implementation of WSR 112 of FIG. 1 or WSR 202 of FIG. 2.

In an embodiment, WSR 302 may include memory 320 for storing rules 324, and statuses 326. Rules 324 may be implemented as a data store of rules and parameters used in connectivity management 310, data processing management 330, and hardware management 340 described below. Rules 324 may include default settings or rules, and parameters or commands received from agency 102A of field personnel 107A operating WSR 302, e.g., WSR 112A of FIG. 1.

In an embodiment, statuses (or attributes) 326 may include three types: WSR statuses, communication channel statuses, and connectivity path statuses. WSR statuses or attributes may be system information or attributes of WSR 302 measured or monitored by modules of hardware management 340. For example, WSR statuses may include a GPS location or time, system time, relative or absolute battery levels or usage, power consumption rate, accelerometer measurements, memory usage, or processor load or usage among other WSR 302 system attributes.

Communication channel statuses may refer to attributes or statuses related to established communication channels, wearable devices of respective communication channels, or data within communication channels. For example, statuses of a communication channel may include, but are not limited to, a signal strength, a download/upload speed, a quality of service possibly measured by an error rate, network congestion, or available bandwidth. Statuses of wearable devices corresponding to communication channels may include requested or required bandwidth to transmit monitored data or networking upload/download speed limitations. Attributes of data within a communication channel may include type of data (e.g., voice, text, video, or image), an amount of data, or a sensitivity of the data.

Connectivity channel statuses may refer to attributes or statuses related to possible, detected connectivity paths, such as connectivity paths 222 or 224 from FIG. 2. For example, statuses of a connectivity path may include a signal strength, a upload/download speed, a quality of service possibly measured by an error rate, network congestion, available bandwidth, or whether the connectivity path provides prioritized access to a user using WSR 302. For example, a connectivity path to a first responder dedicated network, such as 4G LTE network 210B, may provide prioritized use to the user of WSR 302.

In an embodiment, one or more statuses 326 may be gathered or measured by wearable devices 108 that have been detected and communicatively coupled or linked to WSR 302 by modules of connectivity management 310. For example, WSR 302 may store the GPS location provided by one of wearable devices 108 as a WSR status in statuses 326. In an embodiment, various modules may query statuses 326 against rules 324 to determine whether specific rules or parameters have been met. In an embodiment, memory 320 may also store plug-ins 322 configured by one or more modules of connectivity management 310 explained below.

In an embodiment, WSR 302 includes one or more processors for implementing various modules for connectivity management 310, data processing management 330, and hardware management 340. For ease of understanding, descriptions of the modules of FIG. 3 may refer to FIGS. 1-2. A module (or component) of WSR 302 may include a selection of stored operations that when executing in the one or more processors causes the one or more processors to perform the operations of the module.

In an embodiment, modules for performing hardware management 340 may include GPS module 342, network interface module 344, power module 346, I/O interface 348, and resource monitor 347. These modules may monitor and record statuses or attributes of WSR 302.

GPS module 342 may monitor a GPS location (or coordinate) and an exact GPS time captured or received by a GPS chip within WSR 302. In an embodiment, GPS module 342 may store a GPS location and an exact GPS time received by a proximate device, such as mobile device 114 of FIG. 1. In an embodiment, GPS module 342 may store the captured GPS coordinate as a field personnel location status in statuses 326 of memory 320. In an embodiment, WSR 302 may transmit the GPS location to agency 102A periodically, continuously, or by request by agency 102A or by field personnel 107A as set forth in rules 324 of memory 320.

Network interface module 344 may manage one or more networking chips integrated within WSR 302 to provide connectivity or communication channels to wearable devices 108 operating potentially different network interfaces and protocols. In an embodiment, to provide communication channels for a variety of potentially disparate wearable devices 108, WSR 302 may include one or more networking chips such as, for example, Wi-Fi chip 356, or Bluetooth chip 358 for supporting Wi-Fi and Bluetooth, respectively. In an embodiment, network interface module 344 enables the communication channels to be formed for performing interoperability gateway functions for potentially disparate wearable devices 108. Each of the networking chips may include a transceiver having receiver and transmitter functionality for connecting to respective networks.

In an embodiment, to provide connectivity paths to a wide area data network, network interface module 344 may manage or monitor one or more networking chips such as, for example, LTE chip (band 14) 350A, LTE chip (bands 2, 4, 13) 350B, 3G chip 352, or WiMAX chip 354 for supporting connection to one or more of the following wide area data networks: 3G, 4G-LTE, WiMAX, or other wireless broadband networks. By supporting access to an LTE-based public safety network through, for example, LTE chip (band) 350A, WSR 302 may act as a wireless hub for other mobile devices to access the LTE-based public safety network, such as First Net. Each of the networking chips may include a transceiver having receiver and transmitter functionality for connecting to respective wide area data networks.

In an embodiment, by implementing two more networking chips, WSR 302 may enable a user of WSR 302 to dynamically select one connectivity path as providing better connection to the wide area data network. WSR 302 may also concurrently send data over two or more connectivity paths to further increase available bandwidth or to provide more reliable connection to the wide area data network.

I/O interface 346 may manage one or more physical ports of WSR 302. In an embodiment, I/O interface 346 may enable one or more of a universal serial bus (USB) port, an Ethernet port, a serial port, an AC power connection port, or a DC power connection port to be used to charge a battery in WSR 302. In an embodiment, I/O interface 346 supports an I/O port, such as the USB port or Ethernet port, that provides WSR 302 wired connectivity to a separate device, such as wearable device 108, mobile device 114, or router 116 of FIG. 1.

Not only may WSR 302 be powered based on the coupled device, but also WSR 302 may leverage processing capabilities of the separate device using power and IP-over-USB connectivity from the coupled device. In an embodiment, processing capacity and capabilities of the coupled device may be stored in statuses 326 as communication channel statuses or connectivity path statuses if the coupled device provides connectivity to a wide area data network, such as IP network 118 of FIG. 1. Modules within data processing management 330 may determine a distribution of co-processing between WSR 302 and the coupled device. Relatedly, WSR 302 may distribute or balance available battery charge between WSR 302 and a coupled device, such as mobile device 114 of FIG. 1. In an embodiment, WSR 302 may be programmed to provide power and charge to a battery within the coupled device to extend the battery's power. For example, WSR 302 may be using a connectivity path provided by the coupled device and provide additional charge to the coupled device to continue using the provided connectivity path.

In an embodiment, I/O interface 346 may manage one or more sensors or output transducers implemented on WSR 302. For example, output transducers may include one or more of a speaker, a light, or a haptic feedback generator like a vibrating motor. In an embodiment, an intensity, a pattern, or type of output, such as a displayed color by the light, may be configured to represent a status, such as a heart rate level, of field personnel operating WSR 302. For example, an output light may be configured to increase in brightness or blink at a faster rate as a status of field personnel 707 becomes dangerous, e.g., a heart rate level increases. In an embodiment, sensors may include one or more environmental sensors, such as environmental sensor 711 from FIG. 7, or one or more request buttons or touch-screen options that when activated by field personnel 107A sends an associated request. For example, a panic button when pressed may indicate that field personnel 107A is requesting help or immediate assistance. Other requests may include establishing a new VPN tunnel, a connection to wearable device 108 that cannot be currently supported by WSR 302, a connectivity path selection, or another request discussed with regards to modules of WSR 302.

Power module 348 may monitor an absolute or relative power level of a battery, or a rate of use of the battery in WSR 302 providing charge to WSR 302. Power module 348 may periodically or continuously store a current power level to statuses 326 of memory 320. In an embodiment, power module 348 may detect a current power source based on I/O interface 346 and enable the battery to be charged from the current power source.

Resource monitor 349 may monitor and measure one or more hardware or software resource usage of WSR 302. In an embodiment, such resource usage may include one or more of a processor load, a processor speed, a memory load, number of available or configured plug-ins, or other system resource measurements. In an embodiment, resource monitor 349 may also monitor and store statuses of connectivity provided by network interface module 344. Particularly, resource monitor 349 may monitor the communication channel statuses or connectivity path statuses and update them in statuses 326. For example, statuses for a mode of connectivity may include one or more of an available network bandwidth, a signal strength, or a quality of service. Depending on rules 324, resource monitor 349 may periodically, continuously, or by request store the one or more measured resource usage as WSR statuses in statuses 326. In an embodiment, resource monitor 349 may include power module 348 as a component because power consumption or battery metrics is related to hardware usage.

In an embodiment, modules for performing connectivity management 310 may include VPN client 312, plug-in manager 314, user authenticator 316, device detector 317, connectivity module 318, and routing module 319.

VPN client 312 may communicate with a VPN server on agency 102A to establish and maintain a VPN tunnel within IP network 118 between WSR 112 and agency 102A. In an embodiment, VPN client 312 may implement one or more end-to-end encryption methods including hardware or software-based encryption algorithms, such as AES 256, to provide the private and secure communication path between WSR 112A and agency 102A. In an embodiment, all communications on respective connectivity paths between WSR 302 and agency 102A must be transmitted and received through respective secure VPN tunnels. In an embodiment, the encryption method may be stored in rules 324 and a current VPN tunnel or encryption method may be stored in statuses 326. In an embodiment, VPN client 312 may be prompted to establish a new VPN tunnel upon request by field personnel 107A or agency 102A or when a connectivity path changes. In an embodiment, VPN client 312 may provide other secure communication means within the selected connectivity path. For example, VPN client 312 may encrypt and decrypt data to and from the VPN server, respectively.

Plug-in manager 314 may manage the number and specific plug-ins 322 or drivers that have been configured in memory 320 to support communication interfaces of corresponding wearable devices 108. One or more configured plug-in 322 may be configured based on initiation by agency 102A, by request of field personnel 107A, or by detecting an unsupported wearable device 108.

In an embodiment, memory 320 may include a configured plug-in 322 for each corresponding wearable device 108 coupled to PAN 110 provided by WSR 302, such as WSR 112A. The number and types of plug-ins may be based on available memory within memory 320, types of networking connections supported by network module interface 344, or parameters and rule stored in rules 324. In an embodiment, a least recently used plug-in, such as plug-in 322B, may be overwritten or installed with a requested plug-in to support new wearable devices 108 using emerging or new technologies or software.

In an embodiment, plug-in manager 314 may communicate with application server 106 of agency 102A in order to enable WSR 302 to provide gateway functions supporting wearable devices 108 using different communication interfaces and protocols. For example, a fire department may wish to deploy a new kind of smoke detector, such as wearable device 108A, using a USB interface and running vendor-specific software. In an embodiment, agency 102A may electronically transmit a plug-in configuration or driver for supporting communications with the smoke detector. Plug-in manager 314 may receive the plug-in configuration from agency 102A through a VPN tunnel or secure communication means maintained by VPN client 312. Then, depending on authentication, memory load, and rules 324, plug-in manager 314 may install the received plug-in configuration as, for example, plug-in 322A. In an embodiment, upon detection of the smoke detector, plug-in 322A enables WSR 302 to establish the USB connection and vendor-specific interface needed to communicate with the smoke detector.

Using plug-in manager 314 enables WSR 302 to implement a flexible architecture for extending connectivity to a variety of wearable devices 108, which may include legacy devices using outdated communication protocols or interfaces. Moreover, whereas in conventional systems field personnel 107 may need to upload data gathered by wearable devices 108 to a workstation hours after the data was gathered, configured plug-ins 322 enables WSR 302 to telemeter to agency 102A data gathered by wearable devices 108 in real-time. In an embodiment, this flexible architecture also enables different plug-in 322 to be configured and easily scaled across multiple WSRs 112 such that each field personnel 107 may operate wearable devices 108 specific to field personnel 107.

User authenticator 316 may authenticate whether a person using WSR 302, such as WSR 112A, is field personnel 107A and has permission to use WSR 112A. In an embodiment, user authenticator 316 may authenticate the user as field personnel 107A based on data gathered by wearable devices 108 coupled to PAN 110 and stored in statuses 326. For example, statuses 326 may include one or more of vitals statuses, such as a heart rate or fingerprint identification information gathered by WSR 302 itself or received from one or more devices associated with field personnel 107A, such as mobile device 114. One or more of the vital statuses may be used to confirm an identify and authenticate field personnel 107A. In an embodiment, user authenticator 316 may authenticate field personnel 107A based on a received user identifier and password or key corresponding to personnel 107A from a device, such as mobile device 114, supported by plug-in 322.

In an embodiment, user authenticator 316 may authenticate one or more wearable device 108 based on matching device identification such as MAC addresses or IP addresses, user identification, passwords, or keys received from wearable device 108 against authorized IDs, passwords, and keys stored in rules 324.

In an embodiment, upon authenticating the user or wearable device 108, user authenticator 316 enables the use or wearable device 108 access or prioritized access to a private 4G network, such as 4G LTE network (band 14) 210B of FIG. 2.

Device detector 317 may determine whether one or more wearable device 108, such as devices described with respect to FIG. 7, are within a communication range or within a proximity threshold of WSR 302 based on, for example, a detected signal strength. In an embodiment, the types of detectable devices and whether such devices are in range or within a proximity threshold may be received from agency 102A and configured within rules 324. In an embodiment, device detector 317 may determine whether detected wearable devices 108 use communication interfaces supported by corresponding plug-in 322 installed in memory 320.

In an embodiment, device detector 317 may determine proximity of WSR 302 to devices having access to a WAN such as IP network 118 and further determine an optimal connectivity path for accessing IP network 118. Possible connectivity paths may include connection to a network enabled mobile device 114, router 116, or other WSR 112. As described above, one or more connectivity paths may be selected based on various internal and external statuses stored within statuses 326 such as network bandwidths, proximity of devices providing connectivity path, or quality of service measured by bit error rate, or parameters or settings within WSR 112.

Though WSR 302 may have capabilities to form a local ad hoc mesh network 122 and share WAN capabilities of other proximate WSR 112, in an embodiment, WSR 302 may prioritize setting and establishing its own connection to IP network 118 unless a quality of service or other statuses, such as available bandwidth, in statuses 326 fall below an acceptable level as defined in rules 324.

Connectivity module 318 may establish communication links or channels within PAN 110 for wearable devices 108 detected by device detector 317 according to configurations within plug-in 322 installed by plug-in manager 314 to support a communication interface and protocol of corresponding wearable devices 108. In an embodiment, field personnel 107 or wearable device 108 may need to be authenticated by user authenticator 316 before connectivity module 318 establishes a communication link with wearable device 108. In an embodiment, connectivity module 318 may receive data and statuses gathered or monitored by wearable device 108 and forward to modules of data processing management 330.

In an embodiment, connectivity module 318 may perform interoperability gateway functions to convert data or status monitored by wearable device 108 within PAN 110 such that the converted data or status may be processed by agency 102A. As described, such communications may be transmitted and received to and from agency 102A through a connectivity path managed by network interface module 344 to provide connectivity to a wide area data network, such as IP network 118. In an embodiment, VPN client 312 may further establish a VPN tunnel within the connectivity path to enable secure communications.

In an embodiment, connectivity module 318 may detect available connectivity paths. Direct connectivity paths may include a direct access to a mobile network, such as one of mobile networks 232, within a wide area data network provided by networking chips managed by network module interface 344. Indirect connectivity paths may include indirect access to the mobile network provided by devices detected by device detector 317. Based on routing decisions made by routing module 319, connectivity module 318 may maintain one or more connectivity paths to one or more mobile networks for communicating with agency 102A.

Routing module 319 may dynamically select one or more connectivity paths from two or more available, detected connectivity paths to communicate with agency 102A. Communications may include telemetering monitored data of wearable devices 108 to agency 102A. In an embodiment, routing module 319 may periodically or continually assess statuses 326 or rule 324 to select one or more connectivity paths for communications. For example and in reference to FIG. 2, routing module 319 within WSR 202B may detect three available connectivity paths 224A-C. Based on connectivity path statuses, (e.g., quality of service, latency level, signal strength, available bandwidth), WSR 202B may periodically select one of connectivity paths 224A-C having, for example, the highest quality of service.

In an embodiment, routing module 319 may select two or more connectivity paths to be used to concurrently send monitored data. For example and in reference to FIG. 2, routing module 319 of WSR 202B may factor statuses or attributes of data from wearable device 206A (e.g., type of data, tags or fields assigned to data, amount of data, bandwidth requirement of data, etc.) to be telemetered to agency 208 such that voice data is sent through connectivity path 224B having a lower latency compared to connectivity path 224C, and text data is sent to agency 208 through connectivity path 224C.

In an embodiment, modules for performing data processing management 330 may include data processing module 332, data transformation module 333, monitoring module 334, and user-alerting module 336.

Data processing module 332 may include functions for processing or interpreting data or statuses received from wearable device 108. Data processing may include data conversion including converting units of received data, such as from beats/second to beats/minute, or converting format of received data for storing and further analysis. Received data and/or processed data may be stored as statuses 326 or as data files, such as video or image files, within memory 320. In an embodiment, data processing module 332 may receive video frames or files from, for example, body-worn camera 712 of FIG. 7, and perform image recognition to detect faces or license plates. For example, after connectivity module 318 uses a networking chip managed by network module interface 344 to establish a communication channel with body-worn camera 712, data processing module 332 may analyze the received video frames.

In an embodiment, data processing module 332 may receive from agency 102A a processing measure or percentage, which may be stored in rules 324. The processing measure or percentage enables WSR 302 and agency 102 to distribute processing or interpretation of data monitored by wearable devices 108. Therefore, WSR 302 may take advantage of processing capabilities on-site to provide immediate results and easily scalable processing capabilities of agency 102A, which may be implanted by one or more servers in the cloud. In an embodiment, data processing module 332 may distribute processing between WSR 302 and agency 102A differently between configured plug-in 322 based on stored parameters in rules 324.

Data transformation module 333 may modify or supplement data received by coupled devices, such as wearable devices 108 of FIG. 1. In an embodiment, data transformation module 333 may tag or assign received data, such as IP packets, with tags or fields indicating, for example, a type of the data or a quality of service requirement. Data transformation module 333 may assign IP packets based on a type of the data, a type of the originating wearable device, or based on a command from agency 102A. For example, data transformation module 333 may be configured to assign data from a specific device, such as body-worn biosensor 710, to be high priority or requiring a high quality of service. In another example, when data transformation module 333 tags the data by, for example, a quality of service or type (e.g., voice, text, video, or image), routing module 319 may dynamically route data using one or more connectivity paths meeting the needed quality of service or data type.

In an embodiment, data transformation module 333 may disassemble a single data stream received from one of wearable devices 108 into sub-streams or subparts that may be routed by routing module 319 to two or more connectivity paths. Data transformation module 333 may perform the disassembly based on statuses 326 or rules 324. For example, if data transformation module 333 receives from statuses 326 information indicating that a current connectivity path in use for telemetering the single data stream is being overloaded, data transformation module 333 may split the single data stream for sending over two or more connectivity paths to reduce the load on the current connectivity path.

In an embodiment, WSR 302 may receive from agency 102A a single data stream through two or more connectivity paths data. Therefore, in addition to disassembling data, transformation module 333 may also assemble data before processing. In an embodiment, data transformation module 333 may assemble data packets from separate connectivity paths based on tagged information indicating the single data stream and an order to assemble the data packets. For example, a tag may include an IP address or identification that indicates that the data packets are part of the same data stream. Through the assembling functionality, data transformation module 333 may enable WSR 302 to increase bandwidth or quality of service for messages, commands, or information downloaded from agency 102A or other WSRs.

Monitoring module 334 may infer field personnel 107's distress as well as a stressful situation, a performance level, a health risk, or a risk of harm from various biometric signals detected, measured, and output by one or more wearable devices 108, such as body-worn biosensors 710 of FIG. 7, detected by device detector 317 and coupled to PAN 110 by connectivity module 318. In an embodiment, monitoring module 334 may be a thin client software application operating within WSR 302 that is coupled to a remote server, such as application server 106 of agency 102A, which hosts a monitoring application software such as administrative module 416 of FIG. 4.

In an embodiment, monitoring module 334 may interpret data from one or more sensors either singularly or in combination using factors including stored rules 324, such as biosensor threshold values that indicate or infer a condition such as physical or psychological distress, a medical emergency, or a presence of a hazard.

In an embodiment, monitoring module 334 compares a biometric signal with a trigger threshold rule within rules 324 and comprising at least one of: a criteria, a parameter, a static rule, or a dynamic rule to detect when the trigger threshold rule is exceeded. The trigger threshold rule may include but is not limited to at least one of: a change in a value over time, a rate of change of values over time, correlations with data from a different biosensor sensor, correlations with data from an environmental sensor, correlations with data from a GPS system, a health or a fitness condition of the user, a condition of other personnel being monitored in proximity to the user, a material rating, a system rating, or a system limit.

Monitoring module 334 may also interpret output from environmental sensors 711 communicatively coupled to WSR 302 by connectivity module 318. Examples of environmental signals include but are not limited to a chemical level, a radiation level, a biological agent, a sound, an ambient temperature, a pressure, a wind chill, a dew point, a humidity level, a precipitation level, an air pollutant level, a lightning strike, a terrain, an altitude, a location, an air quality level, or a change in any of the above (e.g., a change in a chemical level, a dew point, a precipitation level, or a number of lightning strikes).

When one or more conditions are satisfied or a trigger threshold rule is exceeded, monitoring module 334 may detect an event and electronically transmit an activation message via PAN 110 to body-worn camera 712 and/or other cameras having communication interfaces supported by plug-in 322 to initiate audio and/or visual recording and to transmit the recordings to connectivity module 318 with interoperability gateway functions to send the data to agency 102A.

In an embodiment involving non-wearable beacons, such as beacons 716A-B from FIG. 7, monitoring module 334 may trigger other wearable device 108 based on whether beacon 716A or beacon 716B are in close proximity and other attributes of field personnel operating WSR 302. For example, as shown in FIG. 7, beacon 716B is not within proximity 717 of field personnel 707 and beacon 716A is within proximity 717. In an embodiment, when field personnel wearing WSR 302 leaves a range of beacon 716A statically stationed within a police department, beacon 716A may no longer be in proximity 717 and monitoring module 334 of WSR 302 may trigger body-worn camera 712 to start. In an embodiment, a trigger may include one or more commands for controlling wearable device 108 depending on the specific configurations for beacon 716A and wearable device 108 worn or carried by field personnel 707. Example commands may include turning on device, starting operation such as recording, or sounding an alarm.

In addition, monitoring module 334 may electronically request connectivity module 318 to transmit an event alert message substantially at the same time to agency 102A via a currently selected optimal connectivity path. The event alert message may include information including but not limited to the identity of the biosensor wearing personnel, the biosensor identification, the biosensor data received and processed by monitoring module 334, transformed data derived or based on the biosensor data received (e.g., output from body-worn biosensor 710) depending on processing limitations specified by data processing module 332, the location of the subject wearing the body-worn biosensor, and other environmental or context information.

For example, an accelerometer may be body-worn biosensor 710 that records and electronically transmits information regarding an unusual acceleration of the personnel wearing the biosensor (field personnel 707) indicating a chase, or a deceleration indicating a sudden impact. When the body-worn accelerometer electronically transmits information indicating a sudden deceleration coupled within an increase in the heart rate of field personnel 707 exceeding a normal level as specified in rules 324, monitoring module 334 may use algorithms in rules 324 to infer that an accident has occurred, or a sudden vehicle stop occurred followed by a foot chase or other strenuous physical activity, especially when coupled with location information such as a body-worn GPS unit. With location information over time, monitoring module 334 may use algorithms to infer whether field personnel 707 may be incapacitated by a lack of movement, or that a foot chase is occurring based on changing location information over time that shows movement at an extrapolated rate within a human running pace rate. Further, if biometric signals from the body-worn accelerometer shows further accelerating and decelerating movements, the monitoring module 334 may infer that a possible physical struggle or altercation is occurring.

Sample Rule. Below is an example of a trigger threshold rule.

IF filed personnel 707's accelerometer exceeds −3.0 g at time t

AND IF field personnel 707's heart rate monitor values exceeds the value 120 bpm within 3 seconds prior or 60 seconds after time t, THEN send Event Alert message to agency 102A WHERE the Event Alert message shall contain Wearer ID, Event ID Code and Latitude and Longitude.

The Event Alert message is electronically transmitted to the associated or designated agency 102A by monitoring module 334 via a routing interoperability gateway functions provided by connectivity module 318. The Event Alert message may also be electronically transmitted via a communications network (e.g., PAN 110) to one or more other computing clients such as smartphones (e.g., mobile device 114 with broadband data) where the Event Alert message may be displayed through the computing client application GUI.

In an embodiment, monitoring module 334 may include rules and parameters or be coupled to an automated messaging module (not shown) which contains rules and parameters that electronically transmit advisory messages to the field personnel being monitored. An advisory message may be an audio and/or visual message that includes information such as warnings or status updates regarding body-worn biosensor 710 signals, other biosensor signals, and/or environmental sensor signals, including changes in sensor signals. Advisory messages may be based on the same parameters and rules as Event Alerts or use different threshold values. Advisory messages may be advisory and/or include a user action prompt. For example, an advisory message may indicate that an event alert condition is detected and an emergency incident will be reported unless field personnel 707 declines within a specified time frame, field personnel 707 may select to electronically transmit an event alert message. Field users may interact with monitoring module 334 via I/O interface 346 of WSR 302 including, for example, a GUI display, buttons, a voice interaction interface, or a gesture recognition interface.

In an embodiment, upon fulfilling one or more chained rules, the advisory message or notice may be generated by monitoring module 334 and sent to other WSR 112 via connectivity module 318. For example, upon WSR 302, such as WSR 112C, detecting a radioactivity exceeding thresholds of rules 324, other WSR 112, such as WSR 112D, may receive the advisory message via local ad hoc mesh network 122.

User-alerting module 336 may activate one or more output transducers managed by I/O interface 346 based on request or input from monitoring module to notify field personnel 107 of the advisory message or condition detected by monitoring module 334. For example, upon receiving a warning message from monitoring module 334 indicating that a heart rate of field personnel 107 has exceeded a bpm threshold, user-alerting module 336 may activate a speaker to beep, a light to flash, or a motor to vibrate to warn field personnel 107 of exceeding a pre-determined threshold. The threshold, in this case for heart rate, may be specific to field personnel 107 and pre-determined and stored in rules 324 or may be dynamically determined based on detected statuses of field personnel 107 and environmental conditions.

Figure 4:
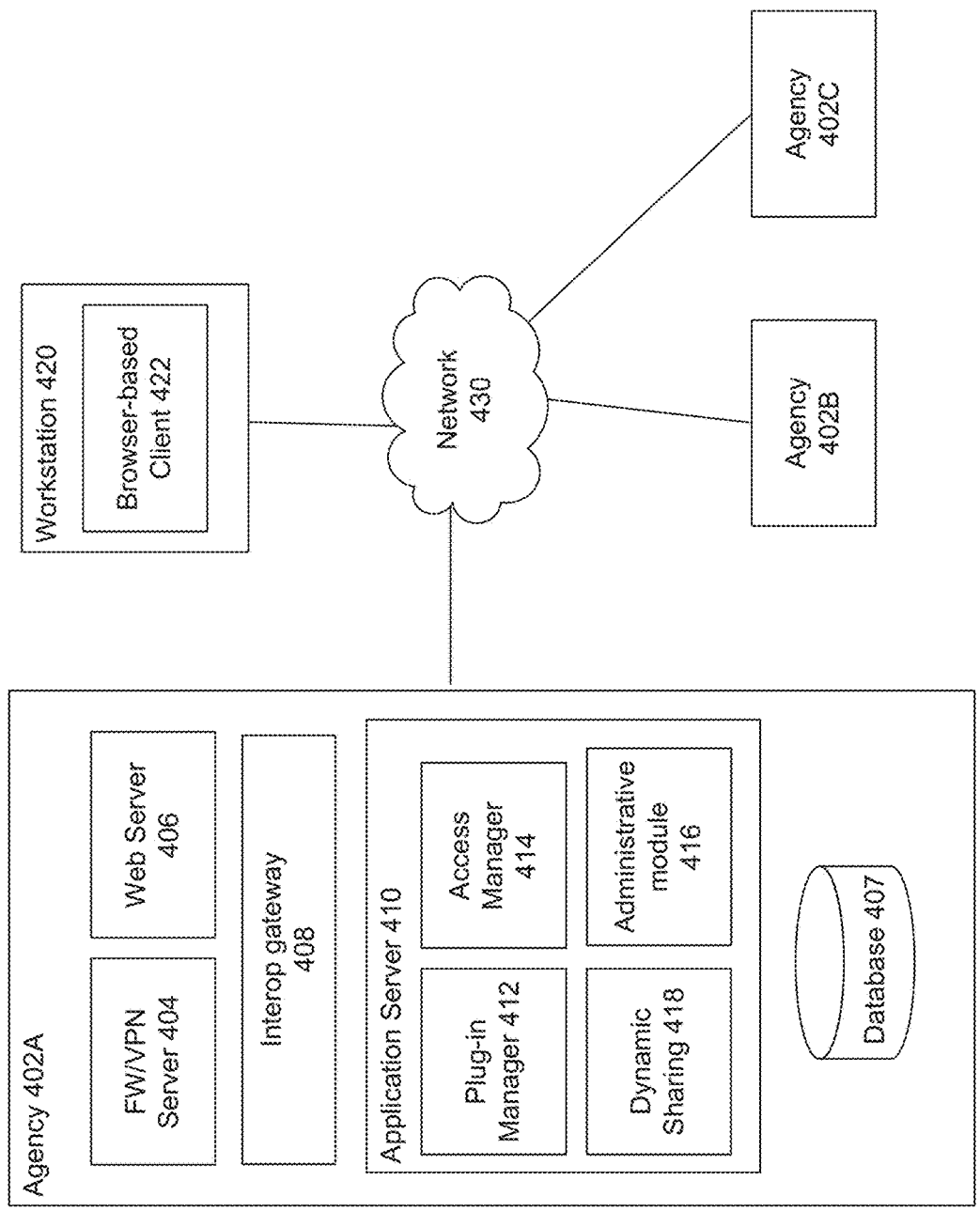
FIG. 4 is a block diagram of a system of agencies coupled to a network, according to an embodiment.

FIG. 4 is a block diagram of a system 400 illustrating agencies 402 coupled via network 430, according to an example embodiment. Agency 402 may each be implemented on one or more servers and represent a security domain specific to a public safety agency. In an embodiment, agency 402, such as agency 402A, may be an exemplary implementation of agency 102A of system 100 from FIG. 1. Therefore, FW/VPN server 404, interop gateway 408, and application server 410 may be exemplary implementations of FW/VPN server 104, interop gateway 105, and application server 106, respectively. For ease of understanding, descriptions of the components of FIG. 4 may refer to FIGS. 1-3.

FW/VPN server 404 may include one or more processors for establishing virtual private network (VPN) tunnels between WSRs 112 managed by agency 402A, such as field personnel 107 managed by agency 102A and further described in FIG. 1. In an embodiment, FW/VPN server 404 may include any of hardware FPG-based or software-based encryption algorithms, such as AES256, that is loaded within VPN client 312 of respective WSR 302 operated by field personnel 107. In an embodiment, FW/VPN server 404 may further provide firewalling functions to monitor and control incoming and outgoing network traffic to and from agency 102A.

Interop gateway 408 operates similarly to interop gateway 105 of FIG. 1 and implements operability gateway functions to enable data monitored by wearable devices 108 of field personnel 107 associated with agency 102A, e.g., agency 402A, to be communicated to and with other agencies 402B-C through network 416. In an embodiment, network 430 may be similar to network 120 of FIG. 1 and implemented as an IP network or as a private, public safety network, such as FirstNet.

Web server 406 may enable a WSR application hosted or implemented by application server 410 to be accessed through browser-based client 422 of workstation 420 operated by an administrator or operator. Workstation 420 may be a desktop, laptop, mobile device, or other computing devices capable of accessing network 430 such as Google glass or a smart watch. In an embodiment, web server 406 or application server 410 may enable access to the WSR application through one or more WSR application instances (not shown) installed on workstation 420.

Database 407 may be any type of structured data store, including a relational database that stores information associated with agency 402A or WSRs of each field personnel 107. For example, database 407 may store rules 324 of WSR 302, number and types of plug-in 322 configured on WSR 302, and current or historical statuses and data telemetered to agency 402A via WSR 302.

Application server 410 may manage WSRs, such as WSR 302 of FIG. 3 or WSR 112 of FIG. 1, operated by field personnel 107 associated with agency 402A. In an embodiment, application server 410 may also provide or host the WSR application implementing a GUI that helps an administrator or operator of workstation 420 monitor statuses or data of field personnel 107 captured by wearable devices 108. In an embodiment, application server 410 may include the following modules: plug-in manager 412, access manager 414, administrative module 416, and dynamic sharing 418. A module (or component) of application server 410 may include a selection of stored operations that when executing in the one or more processors of application server 410 causes the one or more processors to perform the operations of the module.

Plug-in manager 412 may manage and configure the number or types of drivers or plug-ins supported by WSR 302 operated by a corresponding field personnel 107. In an embodiment, an operator of workstation 420 may load a specific plug-in configuration for supporting, for example, wearable device 108A. Plug-in manger 412 may electronically transmit, via VPN tunnels established by FW/VPN server 404, a request to, for example, WSR 302 to install and configure the loaded plug-in configuration to memory 320. In an embodiment, plug-in manager 314 may store in database 407 the loaded plug-in configuration in association with WSRs instructed to install the plug-in configuration. Depending on various attributes stored in database and including one or more of field personnel 107 attributes, wearable devices 108 operated by field personnel 107, or system statuses of WSRs of field personnel 107, plug-in manger 412 may transmit the loaded plug-in configuration to only a subset of field personnel 107.

In an embodiment, plug-in manger 412 may receive a request from a WSR, such as WSR 302, to support a specific wearable device. Depending on an authorization determination by access manager 414, plug-in manager 412 may then load the requested plug-in configuration to support the specific wearable device and transmit the loaded plug-in configuration to WSR 302.

In an embodiment, plug-in manager 412 may store in database 407 WSRs 112 that were not able to successfully download and install the plug-in configuration loaded on application server 410. For example, one or more WSRs 112 may be offline and not connected to IP network 118 of FIG. 1. In an embodiment, plug-in manager 412 may periodically transmit the failed plug-in configuration download attempts or receive an update request from WSRs 112 upon first connection to IP network 118.

Access manager 414 may assign attributes to users, such as field personnel 107 and operators of workstation 420. An assigned attribute of a user may include any of the following: an identity, a key or password, a job title, one or more task, one or more wearable devices associated with the user, one or more agency or group affiliations, one or more access privilege status, or one or more priority settings. The assignments may be received from, for example, an administrator, a human resources manager, or the user's supervisor. In an embodiment, access manager 414 may store the attributes of the user and permission settings associated with each attribute in database 407.

In an embodiment, access manager 414 may determine whether to authorize an administrator or operator using workstation 420 to access the WSR application hosted by application server 410. Access manager 414 may compare one or more user attributes such as a user identification and password or key received from browser-based client 422 with IDs and passwords or keys stored in database 407. In an embodiment, the number of WSRs 112 and specific WSRs 112 along with types of data telemetered by WSRs 112 that are observable and managed by the operator within a GUI provided to browser-based client 422 may depend on attributes and permissions assigned to the requesting administrator or operator.

Therefore, a supervising administrator of workstation 420 may see statuses telemetered from WSR 112 of field personnel 107 under the supervising administrator's command. In an embodiment, some statuses such as a location status of field personnel 107 may be available to any authorized administrator.

Dynamic sharing 418 may work with interop gateway 408 to facilitate dynamic media sharing of data or statuses gathered by field personnel 107 with other agencies 402B-C via network 430. Such methods are discussed in prior filed U.S. Patent Publication 2013/0198517 discussed above. In an embodiment, data and statuses may be shared via browser-based client 422 or third party platforms managed by operators of other agencies 402B-C.

Administrative module 416 may include a software application running on application server 410 and providing a GUI view of the WSR application hosted or implemented by application server 410. In an embodiment, administrative module 416 may be coupled to an application database, such as database 407, or an external database resource such as a directory. Administrative module 416 enables an operator or administrator to manage WSR 112 aggregating, filtering, and processing statuses and data monitored by coupled wearable devices 108, such as body-worn biosensor 710 and/or environmental sensors 711 of FIG. 7, as well as to establish trigger threshold rules stored in rules 324 of WSR 302 and include but are not limited to an established criteria, a parameter, a static rule, or a dynamic rule. The sensors are registered with administrative module 416 and may be assigned a unique identification which may be based on but not limited to at least one unique identifier such as: a sensor machine address, a serial number, an encryption key, an electronic serial number, a telephone number, or an IP address. The sensor ID may be further associated with a unique identification of an individual, field personnel 107, wearing the wearable device 108, such as body-worn camera 712 of FIG. 7, or an individual in proximity to the wearable device 108, where the individual's unique identifier may include but is not limited to at least one of: a name, an agency name, a department ID, an employee ID number, an operator number, a team ID, a badge number, or a social security number.

In an embodiment, administrative module 222 may include a data transformation module to assemble or compile received data or statuses received from WSR 302. For example, to improve quality or bandwidth of connectivity to agency 402A, WSR 302 may have disassembled a single data stream into sub-streams, each sent over a potentially a different connectivity path. In an embodiment, the data transformation module may operate similar to data transformation module 333 of WSR 302. For example, the data transformation module may check identification tags of data sub-streams to assemble the sub-streams into a single data stream.

In an embodiment, administrative module 222 rules or parameters may be unique for each field personnel 107 or each wearable device 108 associated with each field personnel 107, or may be the same for all field personnel 107 or subset of field personnel 107 wearing the same functional type of wearable device 108. For example, field personnel 107A may be assigned a threshold parameter of 120 beats per minute for a heart rate monitor and field personnel 107B may be assigned a threshold parameter of 140 beats per minute for a heart rate monitor.

Administrative module 416 may be centrally provisioned at application server 410 and then trigger threshold rules associated with field personnel 107 are electronically transmitted to and stored by monitoring module 334 of WSR 302 operated by a field personnel. Alternatively, trigger threshold rules may be provisioned by a field personnel associated with or wearing the wearable device. For example, field personnel 107A may set trigger threshold rules through a GUI of WSR 112A. In an embodiment, trigger threshold rules include a combination of rules provisioned centrally by administrative module 416 and rules provisioned by field personnel 107 associated with one or more wearable devices 108 coupled to WSR 112.

Administrative module 416 may be coupled with one or more directories and databases of other systems and software applications (not shown) which contain, maintain, and update user identification, communications and media asset identification, routing, addressing and other information. Administrative module 416 may utilize data in the one or more directories singly or in combination, and may transform and store data in an administrative module directory or database, such as database 407.

Figure 5:
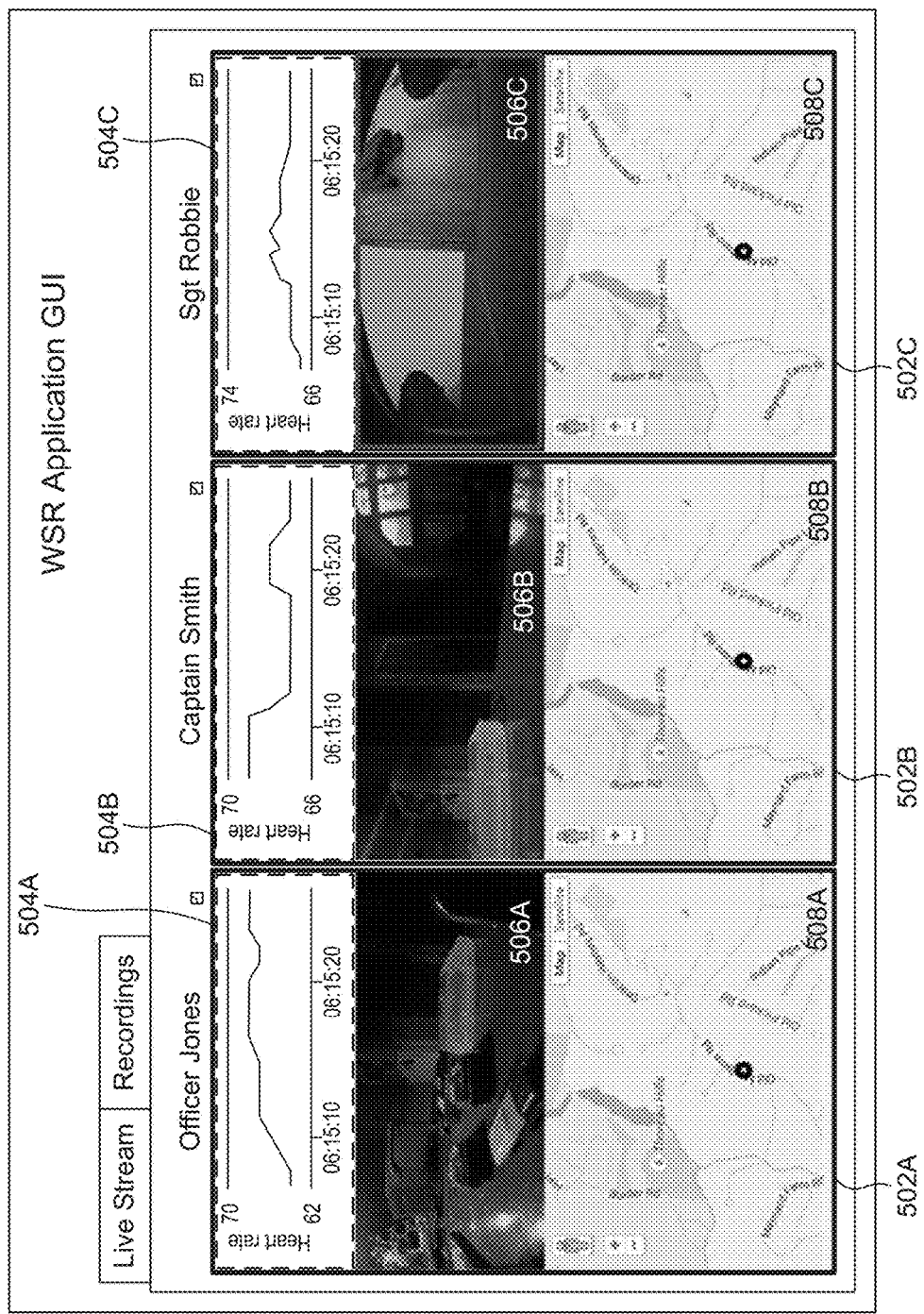
FIG. 5 is a diagram of an example GUI view of a WSR application, according to an example embodiment.

FIG. 5 is an example GUI view 500 of the WSR application implemented or hosted by an agency, such as application server 410 of agency 402A from FIG. 4. For ease of understanding, reference may be made to FIGS. 3, 4, and 7.

In an embodiment, GUI view 500 depicts WSR panes 502 corresponding to field personnel, such as field personnel 107, operating respective WSRs, such as WSR 702 or WSR 302. Each WSR pane 502 may depict statuses or data monitored by wearable devices 108 coupled to WSR 702 and received by administrative module 416 from WSR 112. For example, WSR pane 502 may include a historical heart rate status 504 provided by body-worn biosensor 710, live video feed view 506 provided by body-worn camera 712, and real-time location 508. Real-time location 508 may be received from WSR 302 and determined by GPS module 342 within WSR 302, an example embodiment of WSR 702, or determined by another wearable device coupled to WSR 302.

In an embodiment, the administrator may be the police chief of agency 402A and access manager 414 may, therefore, enable the administrator to view and access information and statuses of all three field personnel including "Officer Jones," "Captain Smith," and "Sgt Robbie" from the police department agency. For example, the number and specific field personnel views available to the administrator may be based on attributes of the police chief including, for example, a permission, a rank, a task, a user identity, or a group identification.

In an embodiment, an alert message may be triggered on Sgt Robbie's WSR, such as by monitoring module 334 on WSR 302. Upon receiving the alert message, administrative module 416 of application server 410 providing the WSR application may indicate the alert message within WSR pane 502C corresponding to Sgt Robbie. As shown, live video feed view 506C may be, for example, bolded with a red frame.

Whereas conventional body-worn cameras 712 are stand-alone systems and are not connected to, or integrated with communications devices typically used in responding situations, a WSR such as WSR 702 enables a live video feed of body-worn cameras to be streamed directly to video feed view 506 within the WSR application GUI of FIG. 5.

Figure 6:
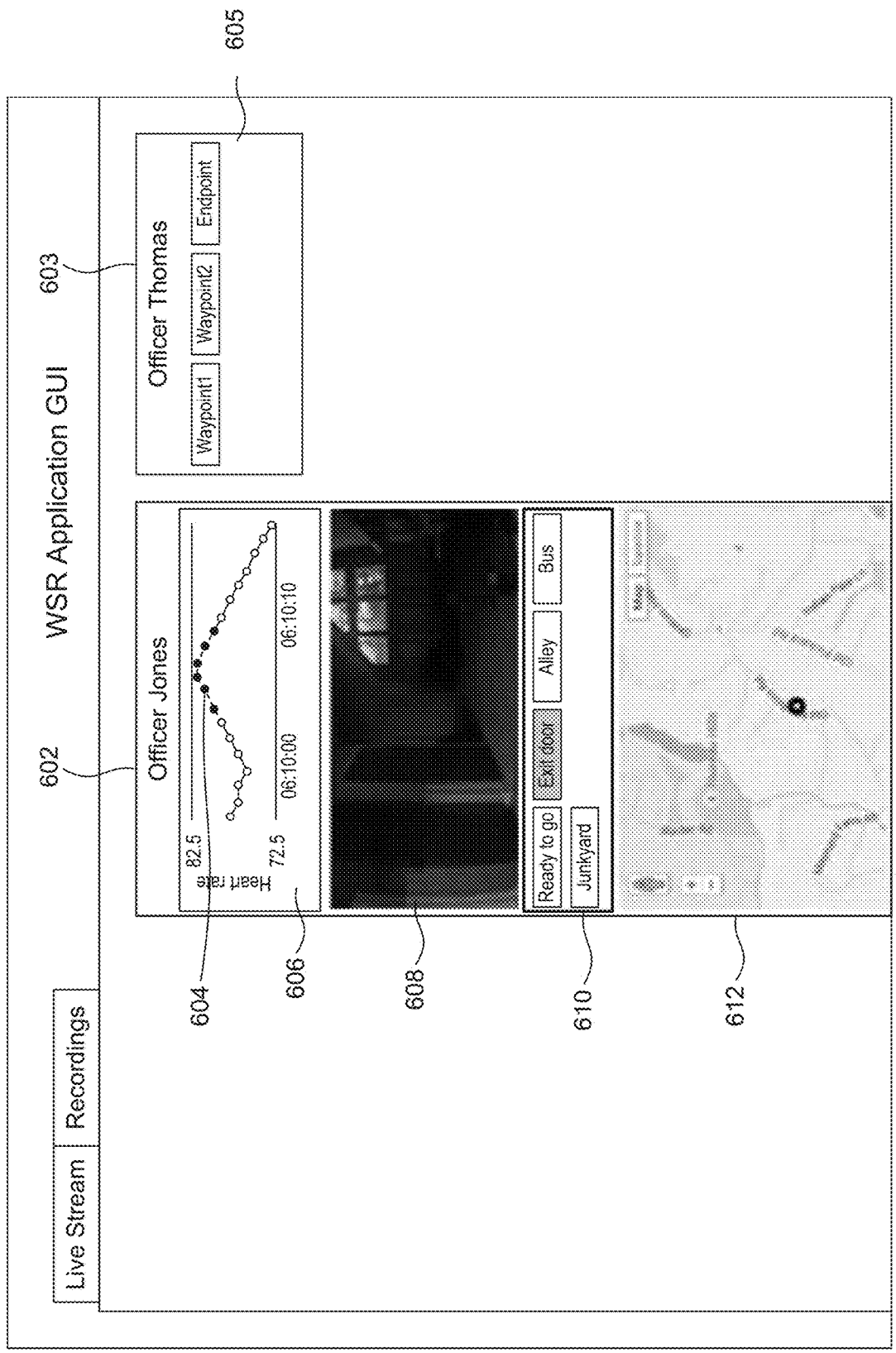
FIG. 6 is a diagram of an example GUI view of a WSR application, according to an example embodiment.

FIG. 6 is an example GUI view 600 of the WSR application implemented or hosted by an agency, such as application server 410 of agency 402A from FIG. 4. For ease of understanding, reference may be made to FIGS. 3, 4, and 7.

Similar to FIG. 5, the example GUI view 600 depicts WSR panes 602 and 603 corresponding to field personnel, such as field personnel 107, operating respective WSRs, such as WSR 702 or WSR 302. Each WSR panes 602 may depict statuses or data monitored by wearable devices 108 coupled to WSR 112, such as WSR 302, and received by administrative module 416 from WSR 112. For example, WSR pane 602 may include a historical heart rate status 606 provided by body-worn biosensor 710, live video feed view 608 provided by body-worn camera 712, beacon indications 610 determined based on signals from beacon 716, and real-time location 612. Real-time location 612 may be received from WSR 302 and determined by GPS module 342 within WSR 302, an example embodiment of WSR 702, or determined by another wearable device coupled to WSR 302.

Whereas in FIG. 5, an alert message received by application server 410 may be related to a video feed and indicated as a bolded red box around live video feed 506C of Sgt Robbie, an alert message indicating a heart rate exceeding, for example, 80 bpm may be bolded 604 within historical heart rate status 606. Therefore, an alert message related to a monitored status may be indicated in association with the monitored status within GUI view 600.

Additionally, an administrator accessing workstation 420 may be determined by access manager 414 to not have permission to access information and statuses telemetered by a WSR operated by "Officer Thomas." Therefore, WSR pane 603 corresponding to "Officer Thomas" may display limited statuses, such as beacon indications 605.

In an embodiment, wearable devices coupled to WSRs may include beacons depicted as beacon indications 610. Based on beacon signals received from a WSR, Administrative module 416 may indicate a field personnel is within proximity to that beacon. For example, beacon "Exit Door" may be shaded to indicate that "Officer Jones" is within proximity of that beacon. Therefore, beacons enable an administrator to obtain more fine-grained data related to field personnel locations, such as within a building where GPS data may be too coarse grained to provide useful indoor location data. In an embodiment, a WSR may further detect when a specific beacon, such as "Exit Door," is no longer within proximity of the WSR. Upon this detection, administrative module 416 may indicate this result by, for example, de-shading the "Exit Door" beacon from beacon indications 610.

Figure 8:
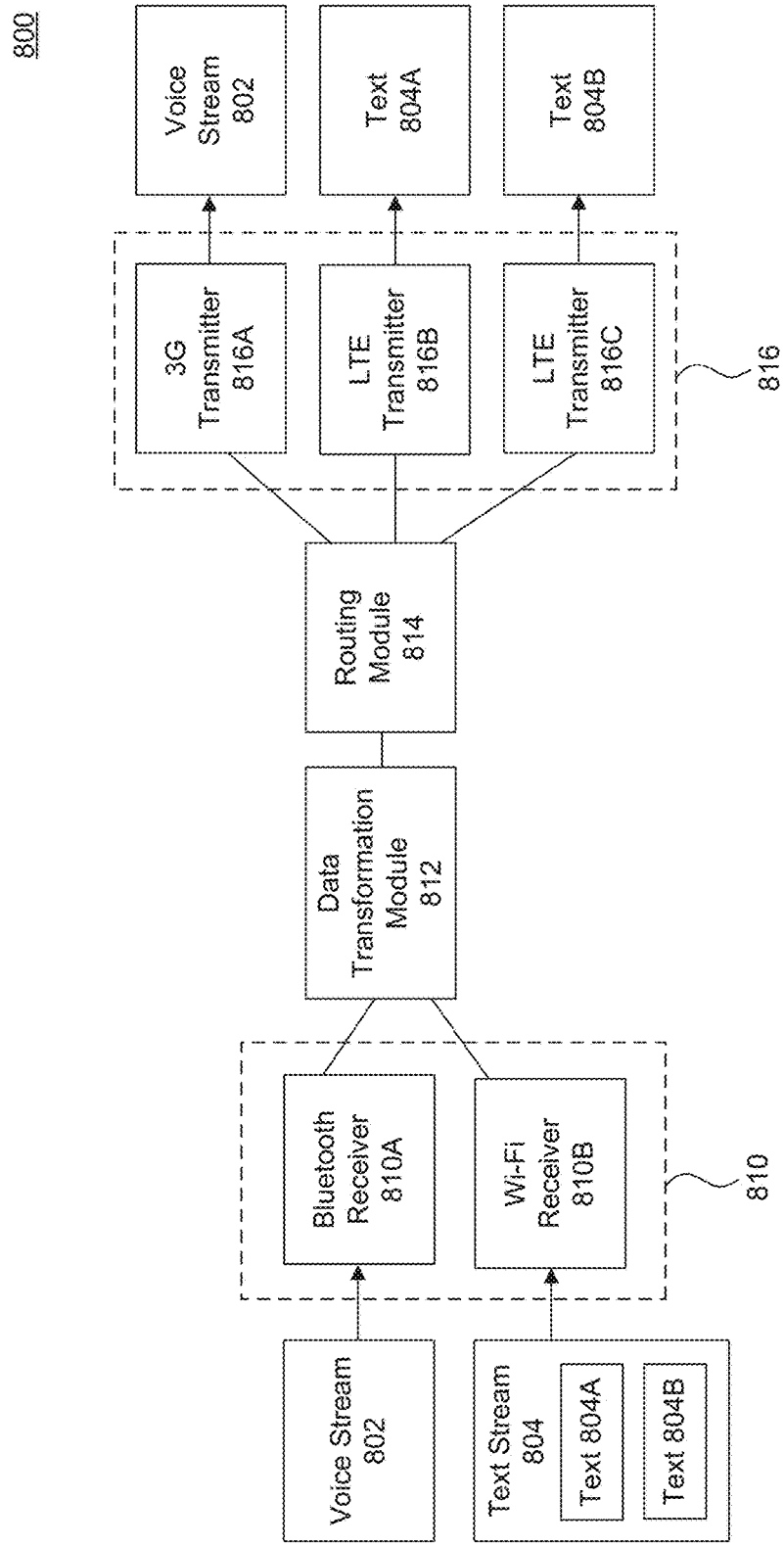
FIG. 8 is a block diagram of data flow within a WSR, according to an example embodiment.

FIG. 8 is a block diagram 800 of data flow within a WSR, such as WSR 302 of FIG. 3, according to an example embodiment. The WSR may include networking receivers 810, data transformation module 812, routing module 814, and networking transmitters 816. Networking receivers 810 and networking transmitters 816 may be components within the one or more networking chips of the WSR.

In this embodiment, the WSR may receive two streams of data from communication channels provided by networking receivers 810. The WSR may receive a first stream of data, voice stream 802, from a wearable device via a communication channel provided by Bluetooth receiver 810A. The WSR may also receive a second stream of data, text stream 804 including text 804A and text 804B, via another communication channel provided by Wi-Fi receiver 810B.

Based on attributes of the data streams or statuses of the communication channels provided by Bluetooth receiver 810A and Wi-Fi receiver 810B, data transformation module 812 may modify or supplement the two streams of data. For example, data transformation module 812 may tag or assign voice stream 802 as a voice data and assign text stream 804 as text data. Data transformation module 812 may additionally disassemble, for example, text stream 804 into text 804A and text 804B.

Routing module 814 may dynamically route the modified data streams to networking transmitters 816 to be sent to an agency, such as agency 102A, via respective one or more connectivity paths. Specifically, in this example, routing module 814 may select the connectivity paths provided by 3G transmitter 816A, LTE transmitter 816B, and LTE transmitter 816C to transmit voice stream 802, text 804A, and text 804B, respectively. As described with respect to FIG. 3, routing module 814 may select a connectivity path for communicating a data stream based on statuses of the available connectivity paths, of the data stream, of the communication channel of the data stream, or of the WSR.

Method

Figure 9:
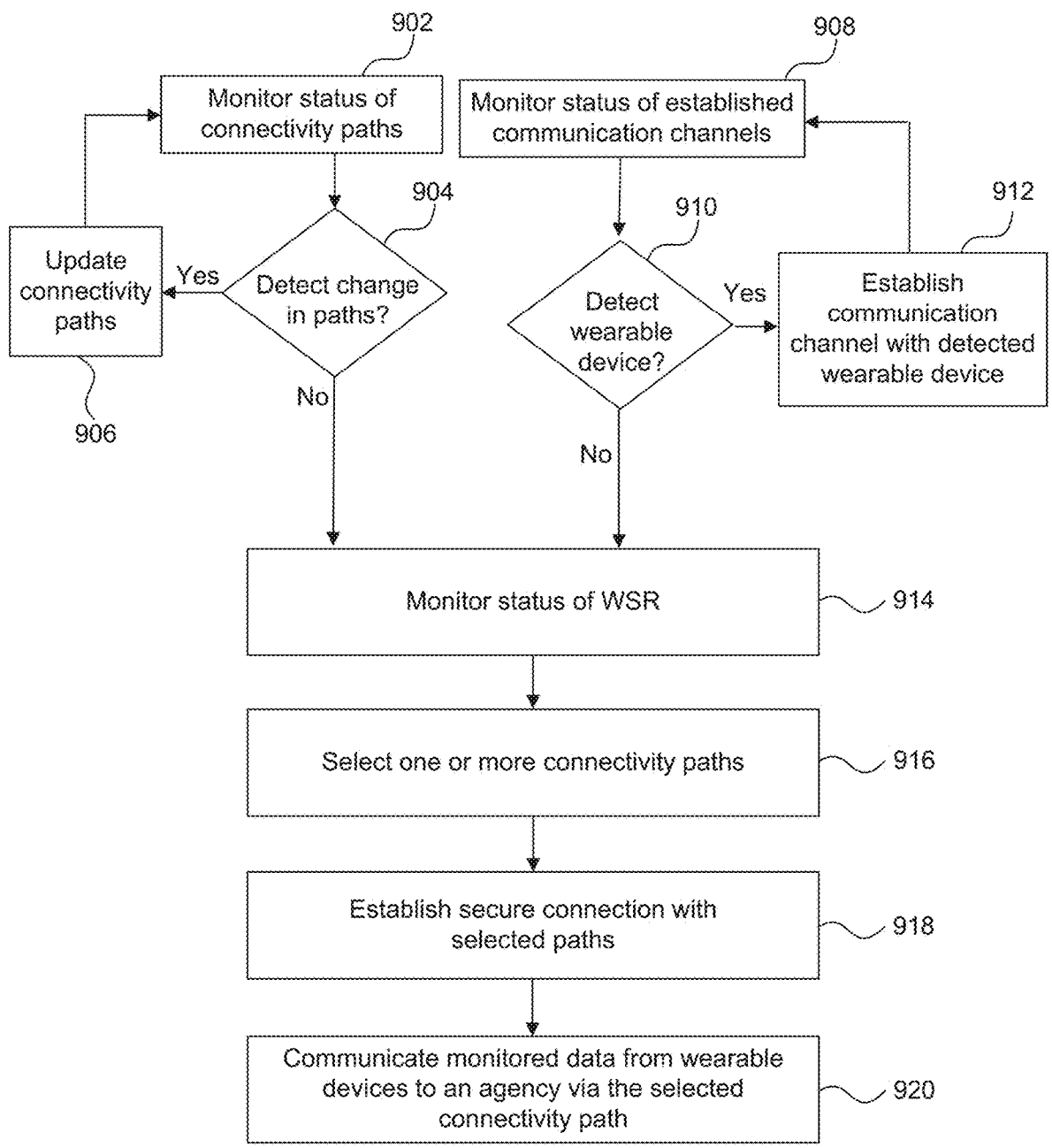
FIG. 9 is a flow chart of a method for enabling a WSR to improve connectivity for telemetering data to an agency, according to an example embodiment.

FIG. 9 is a flow chart of a method 900 for enabling a WSR to improve connectivity for telemetering data from detected wearable devices, such as wearable devices 108 of FIG. 1, to an agency, according to an example embodiment. Method 900 can be performed by processing logic that may comprise hardware (e.g., circuitry, dedicated logic, programmable logic, microcode, etc.), software (e.g., instructions running on a processing device), or a combination thereof. In an embodiment, not all the steps may need to be performed in the order specified. For example, steps 902-910 may be performed concurrently with any of steps 914-920.

In step 902, a resource monitor of the WSR, such as resource monitor 349 of FIG. 3, may continuously or periodically monitor and update statuses of current, available connectivity paths. As described with respect to FIG. 3, example statuses of a connectivity path may include an available bandwidth, a network congestion measurement, or a signal strength.

In step 904, a connectivity module, such as connectivity module 318, detects a change in one or more connectivity paths. For example, the connectivity module may detect the presence of one or more new, available connectivity paths or that one or more previous connectivity paths have been dropped. A connectivity path may be provided by a wired or wireless coupled device having access to a wide area data network, such as IP network 118 of FIG. 1, coupled to an agency, such as agency 102A, associated with a field personnel operating the WSR. In an embodiment, the coupled device may be a mobile device, a router, or another WSR that is capable of forming a local ad hoc mesh network.

In step 906, the connectivity module updates the current, available connectivity paths that may be selected for telemetering data from the coupled wearable devices. In an embodiment, steps 902-906 may be performed concurrently with steps 908-920 of method 500.

In step 908, the resource monitor of the WSR continuously or periodically monitors and update statuses of established communication channels. As described with respect to FIG. 3, example statuses of a communication channel may include an available bandwidth, a network congestion measurement, or a signal strength.

In step 910, a device detector, such as device detector 317, detects one or more wearable devices within a proximity of the WSR. In an embodiment, the device detector may detect only wearable devices operating communication interfaces supported by corresponding plug-ins installed on the WSR, such as plug-in 322 from WSR 302.

In step 912, the connectivity module establishes communication channels with the detected one or more wearable devices of step 910. In an embodiment, a user authenticator, such as user authenticator 316, may need to determine whether the detected wearable device is authorized to communicate with the WSR. The use authenticator may also determine whether the WSR has a plug-in installed for supporting communication with the detected wearable device before the connectivity module may establish the communication channel. In an embodiment, steps 908-912 may be performed concurrently with steps 902-906 and steps 914-920.

In step 914, the resource monitor monitors the attributes or statuses of the WSR. The monitored statuses may include, for example, a preference of the field personnel using the WSR, a current battery level of the WSR, a GPS location, or other attributes discussed with regards to FIG. 3.

In step 916, a routing module, such as routing module 319, selects one or more connectivity paths from the available and monitored connectivity paths of step 902. In an embodiment, the routing module may select the one or more connectivity paths based on one or more of the statuses monitored in steps 902, 908, and 914. For example, a connectivity path may be periodically selected or re-selected based on the types of available connectivity paths, available bandwidth throughput of the connectivity paths, signal strength, processor speed, proximity to devices providing connectivity path, quality of service measured by bit error rate, a relative number of transmission links, user preferences, agency settings, or battery life of the WSR. In an embodiment, the routing module may compare statuses stored in statuses 326 with rules 324 of memory 320 to check whether select statuses are within thresholds and parameters of rules 324.

In an embodiment as described with respect to FIGS. 2 and 3, a connectivity path may be provided by another WSR. In such a case, the WSR may have functionality to communicate with other WSRs forming a WSR mesh network, such as local ad hoc mesh network 122, of WSRs. The WSR may further consider whether to communicate information from the detected device to another WSR that may further relay the communicated information to other WSRs. Information may be chain relayed from one WSR to another WSR until the receiving WSR is designated as the relay gateway. patent application Ser. No. 14/615,070 further describes the process for determining the relay gateway within a mesh network of WSRs.

In step 918, for each selected connectivity path of step 916, a VPN client, such as VPN client 312, establishes a VPN tunnel within the selected connectivity path between the WSR and the agency. Upon establishing the secure VPN tunnel, data communications between the WSR and the agency are communicated privately and securely. In an embodiment, instead of a VPN tunnel, VPN client may provide encryption and decryption functions for providing secure communications.

In step 920, for each selected connectivity path of step 916, a network interface module, such as network interface module 344 of FIG. 3, communicates the routed data to the agency via the selected connectivity path. In an embodiment, the connectivity module may perform interoperability gateway functions to convert the data to be capable of being processed by the agency. The routed data may include data monitored by the detected one or more devices and obtained via the established communication channels of step 912.

Figure 10:
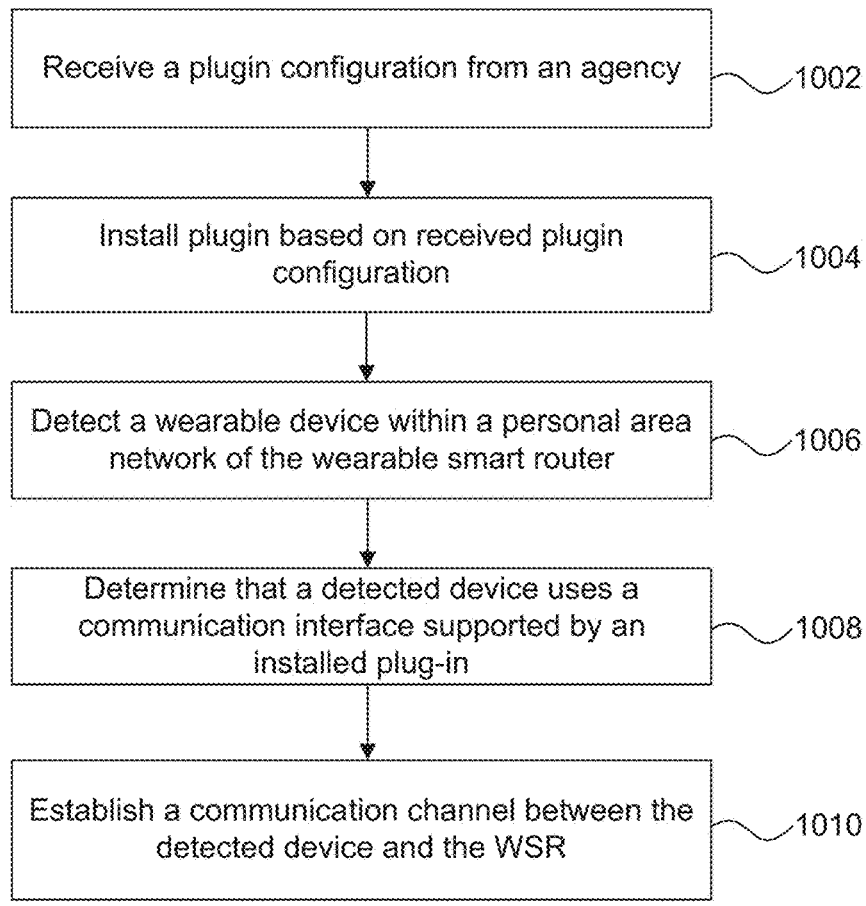
FIG. 10 is a flow chart of a method for enabling a WSR to flexibly interface with different wearable devices, according to an example embodiment.

FIG. 10 is a flow chart of a method 1000 for enabling a WSR to flexibly interface with different wearable devices, according to an example embodiment. Method 800 can be performed by processing logic that may comprise hardware (e.g., circuitry, dedicated logic, programmable logic, microcode, etc.), software (e.g., instructions running on a processing device), or a combination thereof. In an embodiment, not all the steps may be performed or in the order specified.

In step 1002, a plug-in manager of the WSR, such as plug-in manger 314 of WSR 302 of FIG. 3, receives a plug-in configuration from an agency, such as agency 402A of FIG. 4, through a data network, such as IP network 118 of FIG. 1. In an embodiment, the WSR may have been preconfigured with the one or more plug-in configurations to support communication interfaces operated by specific wearable devices.

In an embodiment, an operator may access a WSR monitoring application provided by application server of the agency, such as application server 410 of agency 402A, to add communication interfaces or protocols that should be installed on the WSR. For example, when a new wearable device enters the market, a plug-in configuration supporting the communication interface of the new wearable device is loaded on the application server and transmitted to be downloaded at the WSR.

In step 1004, the plug-in manager downloads and installs the plug-in to memory, such as to plug-in 322A of memory 320, based on the received plug-in configuration of step 1002.

In step 1006, a device detector, such as device detector 317 of WSR 302, detects a wearable device within a proximity of the WSR or accessing a PAN, such as PAN 110A, of the WSR.

In step 1008, the device detector determines that the detected device uses a communication interfaces supported by an installed plug-in, such as the installed plug-in of step 804. In an embodiment, if no installed plug-in supporting the detected device is located, the device detector may send a request to the agency requesting the agency to provide the communication interface to support the detected device. In this embodiment, steps 802 and 804 may be repeated for the requested plug-in configuration.

In step 1010, a connectivity module, such as connectivity module 318 of WSR 302, establishes a communication channel between the detected device of step 1008 and the WSR. In an embodiment, the communication channel or link may be provided to the detected device of step 1008 through a PAN, such as PAN 110 of FIG. 1.

Figure 11:
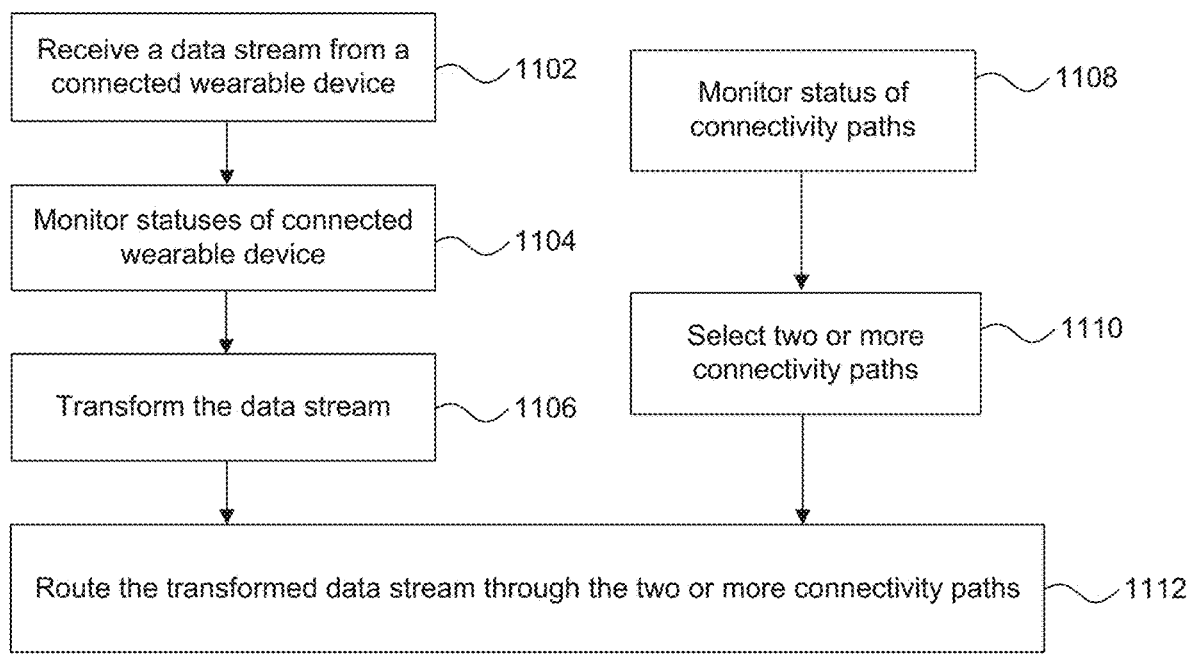
FIG. 11 is a flow chart of a method for routing data through two or more connectivity paths, according to an example embodiment.

FIG. 11 is a flow chart of a method 1100 for enabling a WSR, such as WSR 302 of FIG. 3, to route data through two or more connectivity paths to improve connectivity, according to an example embodiment. Method 1100 can be performed by processing logic that may comprise hardware (e.g., circuitry, dedicated logic, programmable logic, microcode, etc.), software (e.g., instructions running on a processing device), or a combination thereof.

In step 1102, the WSR may receive a data stream from a coupled wearable device, such as wearable device 108 of FIG. 1, via an established communication channel of, for example, step 912 of FIG. 9. In an embodiment, the data stream may be any of the following types: video, text, image, voice, or any combination thereof.

In step 1104, a resource monitor, such as resource monitor 349 of FIG. 3, monitors statuses of the connected/coupled wearable device. In an embodiment, step 1104 may be performed concurrently or before step 1102. Step 1104 may perform similar functionally as described with respect to step 908 of FIG. 9.

In step 1106, a data transformation module, such as data transformation module 333 of FIG. 3, transforms (e.g., modify or supplement) the received data stream of step 1102. In an embodiment, the data transformation module may disassemble the data stream into two or more sub-streams or sub-parts. The data transformation module may additionally assign or tag the sub-streams with identification information and assembly order such that a receiving entity, such as agency 102A of FIG. 1, may assemble the sub-streams into the original data stream. In an embodiment, the data transformation module may perform the transformations or modifications based on statuses of the two or more available connectivity paths, of the communication channel providing the received data stream of step 1102, or of the WSR.

In step 1108, the resource monitor monitors and updates statuses of available connectivity paths. For example and further described with respect to FIG. 3, statuses may include an available bandwidth or a signal strength. In an embodiment, step 1108 may perform similar functionally as described with respect to step 902 of FIG. 9.

In step 1110, a connectivity module, such as connectivity module 318, selects two or more connectivity paths from available connectivity paths for accessing a wide area data network, such as IP network 118 of FIG. 1. In an embodiment, the selection may be based on one or more of statuses monitored from steps 1108 or 1104. Step 1110 may perform similar functionally as described with respect to step 916 of FIG. 9.

In step 1112, a routing module, such as routing module 319 of FIG. 3, routes the transformed (e.g., disassembled) data stream of step 1106 through the two or more selected connectivity paths of step 1110. For example, in step 1106, the single data stream may be disassembled into a first data sub-stream and a second data sub-stream. Then in step 1112, the routing module may send each sub-stream through each selected connectivity path, respectively. In another example, in step 1106, the single data stream may not be split into sub-streams and is instead tagged with, for example, a data type indicating voice data. In this example, the routing module may route the single data stream to be communicated to the agency via one of the selected connectivity paths that provides, for example, better quality of service or lower latency for transmitting voice data.

Figure 12:
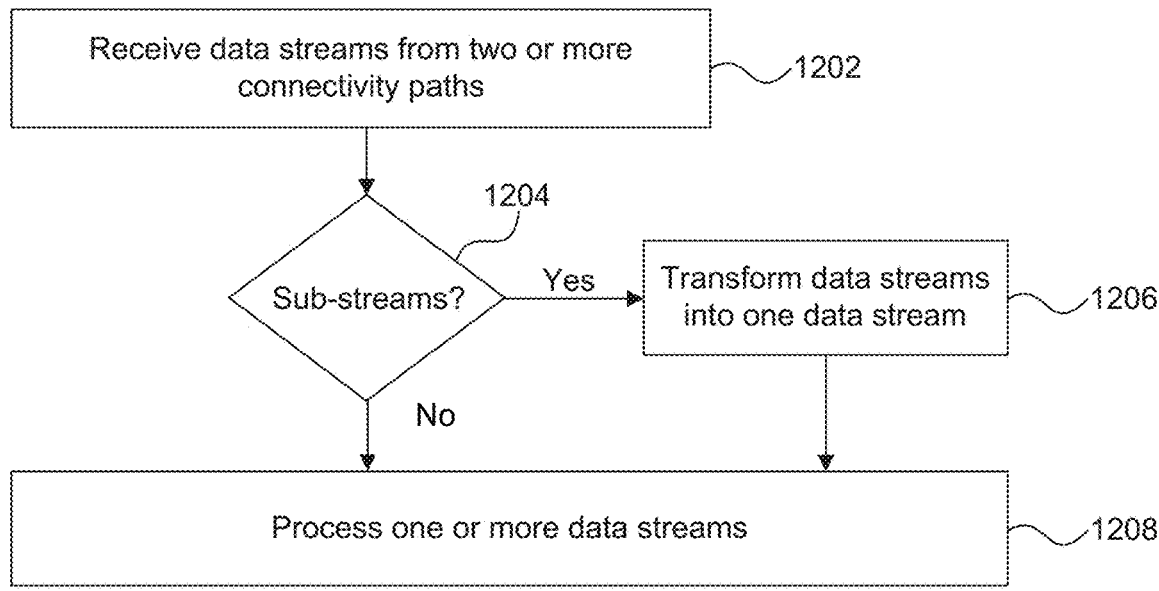
FIG. 12 is a flow chart of a method for receiving data through two or more connectivity paths, according to an example embodiment.

FIG. 12 is a flow chart of a method 1200 for receiving data through two or more connectivity paths enabling a WSR, such as WSR 302 of FIG. 3, to improve connectivity, according to an example embodiment. Method 1200 can be performed by processing logic that may comprise hardware (e.g., circuitry, dedicated logic, programmable logic, microcode, etc.), software (e.g., instructions running on a processing device), or a combination thereof.

In step 1202, a network interface module, such as network interface module 344 of WSR 302 of FIG. 3, receives data streams from two or more connectivity paths connecting the WSR to an agency, such as agency 102A of FIG. 1.

In step 1204, a data transformation module, such as data transformation module 333 of FIG. 3, determines whether the received data streams are part of the same stream, i.e., the received data streams are sub-streams or sub-parts. The data transformation module may check a tag or field of, for example, received IP packets within different data streams to determine that the received IP packets are part of the same data stream.

In step 1206, when the data transformation module determines two or more received data streams contain data from the same data stream, the data transformation module transforms, e.g., assembles, the received data into a single data stream.

In step 1208, data processing management components of WSR, such as data processing management 330, processes the potentially transformed one or more data streams. By enabling a single data stream to be received via two or more connectivity paths, WSR 302 may increase the quality of service or bandwidth of data received from the agency.

System Implementation

Figure 13:
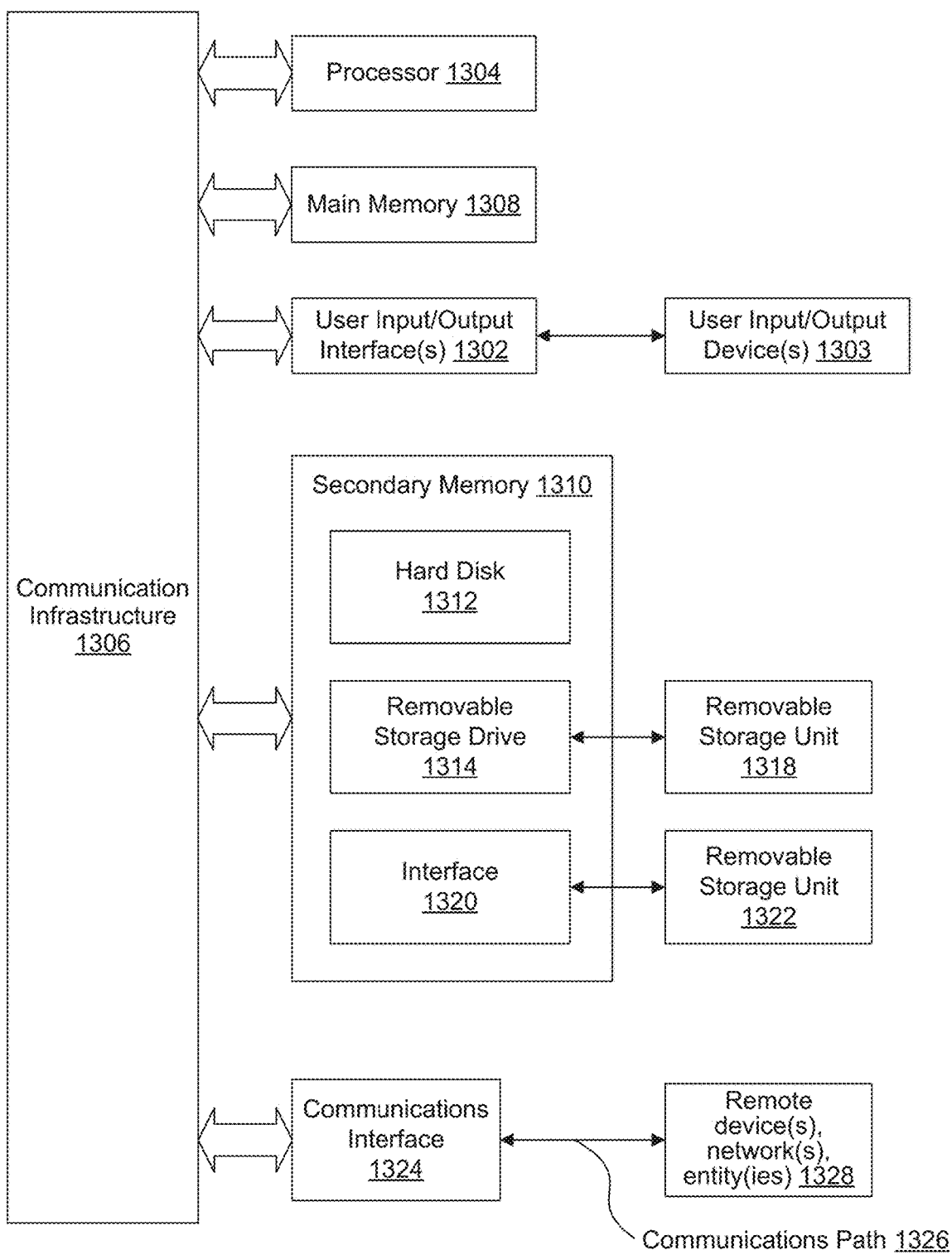
FIG. 13 is a diagram of an example computing system, according to an example embodiment.

Various embodiments can be implemented, by software, firmware, hardware, or a combination thereof. FIG. 13 illustrates and example computer system 1300 in which the systems and devices described within various embodiments can be implemented as computer-readable code and/or text-readable code. After reading this description, it will become apparent to a person skilled in the relevant art how to implement the embodiments using other systems and/or processing architectures.

Computer system 1300 includes one or more processors (also called central processing units, or CPUs), such as a processor 1304. Processor 1304 is connected to a communication infrastructure or bus 1306.

One or more processors 1304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 also includes user input/output device(s) 1303, such as monitors, keyboards, pointing devices, etc., that communicate with communication infrastructure 1306 through user input/output interface(s) 1302.

Computer system 1300 also includes a main or primary memory 13013, such as random access memory (RAM). Main memory 1309 may include one or more levels of cache. Main memory 1309 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 818. Removable storage unit 1317 includes a computer usable or readable storage device having stored thereon computer software (control logic) and/or data. Removable storage unit 1317 may be a floppy disk, magnetic tape, compact disk, DVD, optical storage disk, and/any other computer data storage device. Removable storage drive 1314 reads from and/or writes to removable storage unit 1317 in a well-known manner.

According to an exemplary embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible apparatus or article of manufacture comprising a tangible computer useable or readable medium having control logic (software) stored thereon is also referred to herein as a computer program product or program storage device. This includes, but is not limited to, computer system 1300, main memory 1308, secondary memory 1310, and removable storage units 1317 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 13. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. A portable system, comprising:
    a memory;
    at least one networking chip;
    at least one processor coupled to the memory and the at least one networking chip;
    a connectivity module that when executing in the at least one processor:
        establishes a plurality of communication channels for receiving data monitored by one or more devices within a proximity threshold of the portable system, wherein each communication channel corresponds to a respective device, and
        detects a first connectivity path and a second connectivity path using the at least one networking chip, wherein each connectivity path provides access to a wide area data network;
    a network interface module that when executing in the at least one processor receives first data from a first device of the one or more devices via a first communication channel of the plurality of communication channels;
    a data transformation module that when executing in the at least one processor transforms the first data into a first data part and a second data part; and
    a routing module that when executing in the at least one processor:
        routes the first data part to the first connectivity path for sending to an agency; and
        concurrently routes the second data part to the second connectivity path for sending to the agency while routing the first data part.

2. The system of claim 1, wherein the network interface module further communicates the first data part to the agency via the first connectivity path, and communicates the second data part to the agency via the second connectivity path.

3. The system of claim 1, further comprising a virtual private network (VPN) client that when executing in the at least one processor:
    establishes a first VPN tunnel within the first connectivity path; and;
    establishes a second VPN tunnel within the second connectivity path.

4. The system of claim 3, wherein the network interface module communicates the first data part to the agency via the first VPN tunnel, and communicates the second data part to the agency via the second VPN tunnel.

5. The system of claim 1, further comprising a virtual private network (VPN) client that when executing in the at least one processor:

encrypts, within the first connectivity path, the first data part for sending to the agency; and encrypts, within the second connectivity path, the second data part for sending to the agency.

6. The system of claim 1, wherein the network interface module receives second data from a second device of the one or more devices via a second communication channel of the plurality of communication channels.

7. The system of claim 6, wherein the routing module selects at least one of the first connectivity path or the second connectivity path for sending the second data to the agency.

8. The system of claim 6, wherein the data transformation module transforms the second data into a third data part and a fourth data part; and the routing module:
routes the third data part to the first connectivity path for sending to the agency; and
concurrently routes the fourth data part to the second connectivity path for sending to the agency while routing the third data part.

9. The system of claim 1, comprising a first networking chip for providing the first connectivity path and a second networking chip for providing the second connectivity path.

10. The system of claim 1, further comprising a device detector that when executing in the at least one processor detects the first device within the proximity threshold.

11. The system of claim 10, wherein the device detector detects the first device within the proximity threshold based on at least one of a signal strength or a geolocation of the first device.

12. A method, comprising:
establishing, by a connectivity module within a wearable smart device implemented on one or more processors, communication channels for receiving data monitored by one or more devices within a proximity threshold of the wearable smart device, wherein each communication channel corresponds to a respective device;
detecting, by the connectivity module, a first connectivity path and a second connectivity path using at least one networking chip, wherein each connectivity path provides access to a wide area data network;
receiving, by a network interface module within the wearable smart device, first data from a first device of the one or more devices via a first communication channel of the communication channels;
transforming, by a data transformation module within the wearable smart device, the first data into a first data part and a second data part; and routing, by a routing module within the wearable smart device, the first data part to the first connectivity path for sending to an agency; and
routing, by the routing module, the second data part to the second connectivity path for sending to the agency while routing the first data part.

13. The method of claim 12, further comprising communicating, by the network interface module, the first data part to the agency via the first connectivity path, and the second data part to the agency via the second connectivity path.

14. The method of claim 12, further comprising
establishing, by a virtual private network (VPN) client within the wearable smart device, a first VPN tunnel within the first connectivity path; and
establishing, by the VPN client, a second VPN tunnel within the second connectivity path.

15. The method of claim 14, wherein:
communicating the first data part to the agency via the first connectivity path comprises communicating the first data part via the first VPN tunnel; and
communicating the second data part to the agency via the second connectivity path comprises communicating the second data part via the second VPN tunnel.

16. The method of claim 12, further comprising receiving, by the network interface module, second data from a second device of the one or more devices via a second communication channel of the communication channels.

17. The method of claim 16, further comprising, selecting, by the routing module, at least one of the first connectivity path or the second connectivity path for sending the second data to the agency.

18. The method of claim 16, further comprising:
transforming, by the data transformation module, the second data into a third data part and a fourth data part;
routing, by the routing module, the third data part to the first connectivity path for sending to the agency; and
routing, by the routing module, the fourth data part to the second connectivity path for sending to the agency while routing the third data part.

19. The method of claim 12, further comprising, detecting, by a device detector within the wearable smart device, the first device within the proximity threshold.

20. The method of claim 19, wherein detecting the first device within the proximity threshold comprises detecting the first device within the proximity threshold based on at least one of a signal strength or a geolocation of the first device.

* * * * *